United States Patent
Münster et al.

(10) Patent No.: US 11,584,112 B2
(45) Date of Patent: Feb. 21, 2023

(54) TRANSPARENT POLYMER FILM WITH DISCOLORATION COMPENSATION

(71) Applicant: KLÖCKNER PENTAPLAST GMBH, Heiligenroth (DE)

(72) Inventors: Jochen Münster, Zielebach (CH); Adrian Wyss, Münsingen (CH)

(73) Assignee: Klöckner Pentaplast GmbH, Heiligenroth (DE)

( * ) Notice: Subject to any disclaimer, the term of this patent is extended or adjusted under 35 U.S.C. 154(b) by 0 days.

(21) Appl. No.: 17/059,340

(22) PCT Filed: May 22, 2019

(86) PCT No.: PCT/EP2019/063231
§ 371 (c)(1),
(2) Date: Nov. 27, 2020

(87) PCT Pub. No.: WO2019/228888
PCT Pub. Date: Dec. 5, 2019

(65) Prior Publication Data
US 2021/0237412 A1      Aug. 5, 2021

(30) Foreign Application Priority Data

May 29, 2018 (DE) .......................... 102018112817.7

(51) Int. Cl.
*B32B 27/20* (2006.01)
*B32B 27/08* (2006.01)
(Continued)

(52) U.S. Cl.
CPC .............. *B32B 27/20* (2013.01); *B32B 27/08* (2013.01); *B32B 27/304* (2013.01); *C08J 5/18* (2013.01); *C08K 5/0041* (2013.01); *B32B 2250/24* (2013.01); *B32B 2250/40* (2013.01); *B32B 2307/4026* (2013.01);
(Continued)

(58) Field of Classification Search
CPC combination set(s) only.
See application file for complete search history.

(56) References Cited

U.S. PATENT DOCUMENTS

| 2005/0245677 A1 | 11/2005 | Tsukamoto |
| 2006/0121392 A1* | 6/2006 | Nakatsugawa .......... G02B 5/22 |
| | | 430/270.17 |

(Continued)

FOREIGN PATENT DOCUMENTS

| EP | 0 239 100 A2 | 9/1987 |
| EP | 3 453 734 A1 | 3/2019 |

(Continued)

OTHER PUBLICATIONS

Internations Search Report, corresponding PCT/EP2019/063231, filed May 22, 2019.

*Primary Examiner* — Ramsey Zacharia
(74) *Attorney, Agent, or Firm* — ProPat, LLC; Cathy R. Moore

(57) ABSTRACT

A single-layer or multilayer film formed from one or more polymeric materials has CIE colour values a* and b* such that $-7 \leq a^* \leq 0$, $-15 \leq b^* \leq 0$ and an optical transmission T such that $60\% \leq T \leq 95\%$. The inventive, transparent films provide discoloration compensation that alleviates yellowing caused by UV light.

9 Claims, 11 Drawing Sheets

(51) Int. Cl.
  *B32B 27/30* (2006.01)
  *C08J 5/18* (2006.01)
  *C08K 5/00* (2006.01)
  *B32B 7/12* (2006.01)
  *B32B 27/32* (2006.01)
  *B32B 27/36* (2006.01)
  *C08L 27/08* (2006.01)

(52) U.S. Cl.
  CPC ... *B32B 2307/412* (2013.01); *B32B 2307/732* (2013.01); *B32B 2439/40* (2013.01); *C08J 2327/08* (2013.01)

(56) References Cited

U.S. PATENT DOCUMENTS

| | | | |
|---|---|---|---|
| 2008/0158490 A1* | 7/2008 | Nakayama | G02F 1/133634 349/117 |
| 2010/0052202 A1 | 3/2010 | Otto et al. | |
| 2019/0129078 A1* | 5/2019 | Won | C08K 5/3417 |

FOREIGN PATENT DOCUMENTS

| | | |
|---|---|---|
| JP | 3 140 252 B2 | 3/2001 |
| WO | 2002/098959 A1 | 12/2002 |
| WO | 2010/090893 A1 | 8/2010 |

* cited by examiner

TRANSPARENT POLYMER FILM WITH DISCOLORATION COMPENSATION

CROSS-REFERENCE TO RELATED APPLICATIONS

This application is being filed under 35 U.S.C. § 371 as a National Stage Application of pending International Application No. PCT/EP2019/063231 filed May 22, 2019, which claims priority to the following parent application: German Patent Application No. 10 2018 112 817.7, filed May 29, 2018. Both International Application No. PCT/EP2019/063231 and German Patent Application No. 10 2018 112 817.7 are hereby incorporated by reference herein in their entirety.

FIELD OF THE INVENTION

The present invention relates to a single-layer or multilayer transparent film composed of one or more polymeric materials.

BACKGROUND OF THE INVENTION

Transparent coloured films composed of polymeric materials are known in the prior art.

EP 0 239 100 A2 (U.S. Pat. No. 4,740,400 A) describes a transparent, heat-shrinkable multilayer film having at least one layer which comprises a vinylidene chloride-vinyl chloride copolymer and at least one layer which comprises a thermoplastic polymer, where the multilayer film contains dioxazine violet pigment and has a violet colour shade.

JP 3 140 252 B2 relates to packaging for foods having a transparent, lightly violet-coloured region composed of a polymeric multilayer film with gas barrier, comprising a layer of PVdC, EVOH or PET.

Films composed of various chlorine-containing polymeric materials, for example vinyl chloride polymer (VCP) and polyvinylidene chloride (PVdC), alter on long-term irradiation with UV light. Here, in a manner similar to thermal decomposition, hydrogen chloride is liberated by elimination reactions, leading to formation of conjugated polyene sequences in the polymer backbone, so that when there is a sufficiently large number of conjugated double bonds, absorption in the visible range of light occurs and a colouration of the polymer perceptible to the human eye thus results. An increased UV dose brings about, in particular, an initially yellowish and increasingly brownish discolouration of the polymer as a result of the increase in the conjugated double bond units (sequences). Since processes of thermal and/or UV-induced decomposition of VCP and PVdC follow a similar mechanism of dehydrochlorination, many of the materials used for thermal stabilization of VCP and PVdC can also be used for stabilization against UV radiation. UV-absorbing substances such as organic UV absorbers, derivatives of salicylic acid, resorcylic acid, benzophenone (e.g. 2,2'-dihydroxybenzophenone), benzotriazole or mineral nanoparticles are different from these. In the prior art, the mineral nanoparticles are preferred since organic absorbers frequently display selectivity in their UV-filtering properties and also have a low long-term stability. A UV absorber in combination with a thermal or UV stabilizer is usually employed for protection. Inorganic absorbers such as mineral nanoparticles also scatter visible light having wavelengths in the range from 380 to 780 nm and bring about considerable clouding of the film.

The UV stabilizers and UV absorbers known in the prior art are frequently not suitable for various applications because of food laws, regulations for pharmacological product safety or because of impairment of the visual appearance.

Accordingly, films intended for such applications cannot be provided with UV stabilizers and UV absorbers and on prolonged irradiation with UV light are subject to decomposition which, while it does not impair the function of the packaging, is clearly perceptible as yellowing and gives the consumer the impression of low shelf life and product quality.

SUMMARY OF ADVANTAGEOUS EMBODIMENTS OF THE INVENTION

It is an object of the present invention to alleviate the above problem and provide a transparent film with discolouration compensation.

DETAILED DESCRIPTION OF ADVANTAGEOUS EMBODIMENTS OF THE INVENTION

Figure 1:
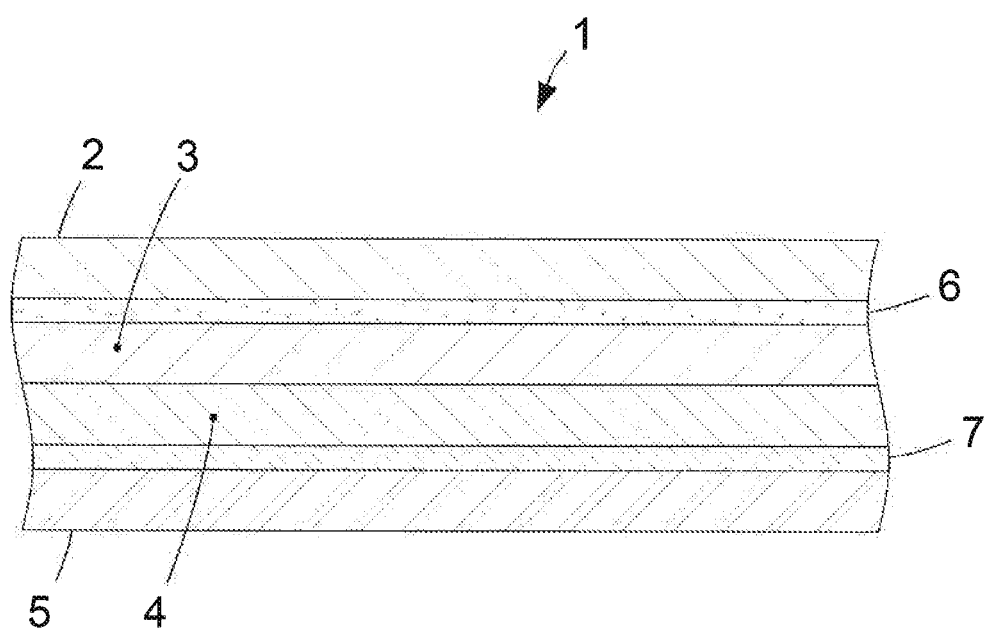
FIG. 1 is a schematic sectional view of an exemplary film having four layers and two bonding layers.

This object is achieved by a single-layer or multilayer transparent film composed of one or more polymeric materials having CIE colour values a* and b* such that $-7 \leq a^* \leq 0$, $-15 \leq b^* \leq 0$ and an optical transmission T such that $60\% \leq T \leq 95\%$.

In addition, the object of the invention is achieved by a single-layer or multilayer transparent film composed of one or more polymeric materials having an optical transmission T such that $60\% \leq T \leq 95\%$, where the film contains one or more main dyes which absorb light having wavelengths in the range from 520 to 600 nm.

Advantageous embodiments of the above-described films are characterized in that:

- $-7 \leq a^* \leq -5$, $-6 \leq a^* \leq -4$, $-5 \leq a^* \leq -3$, $-4 \leq a^* \leq -2$, $-3 \leq a^* \leq -1$ or $-2 \leq a^* \leq 0$;
- $-7 \leq a^* \leq -6$, $-6 \leq a^* \leq -5$, $-5 \leq a^* \leq -4$, $-4 \leq a^* \leq -3$, $-3 \leq a^* \leq -2$, $-3 \leq a^* \leq -2$ or $-1 \leq a^* \leq 0$;
- $-15 \leq b^* \leq -11$, $-13 \leq b^* \leq -9$, $-11 \leq b^* \leq -7$, $-9\ b^* \leq -5$, $-7 \leq b^* \leq -3$, $-5 \leq b^* \leq -1$ or $-3 \leq b^* \leq 0$;
- $-15 \leq b^* \leq -14$, $-14 \leq b^* \leq -13$, $-13 \leq b^* \leq -12$, $-12 \leq b^* \leq -11$, $-11 \leq b^* \leq -10$, $-10 \leq b^* \leq -9$, $-9 \leq b^* \leq -8$, $-8 \leq b^* \leq -7$, $-7 \leq b^* \leq -6$, $-6 \leq b^* \leq -5$, $-5 \leq b^* \leq -4$, $-4 \leq b^* \leq -3$, $-3 \leq b^* \leq -2$, $-2 \leq b^* \leq -1$ or $-1 \leq b^* \leq 0$;
- a standard deviation of the CIE value a* in the total film is $\leq 2$;
- a standard deviation of the CIE value a* in the total film is $\leq 1$;
- a standard deviation of the CIE value a* in the total film is $\leq 0.5$;
- a standard deviation of the CIE value b* in the total film is $\leq 2$;
- a standard deviation of the CIE value b* in the total film is $\leq 1$;
- a standard deviation of the CIE value b* in the total film is $\leq 0.5$;
- the film has an optical transmission T such that $65\% \leq T \leq 95\%$, $70\% \leq T \leq 95\%$, $75\% \leq T \leq 95\%$, $80\% \leq T \leq 95\%$, $85\% \leq T \leq 95\%$ or $90\% \leq T \leq 95\%$;
- the film has an optical transmission T such that $60\% \leq T \leq 92\%$;
- the film has an optical transmission T such that $65\% \leq T \leq 92\%$, $70\% \leq T \leq 92\%$, $75\% \leq T \leq 92\%$, $80\% \leq T \leq 92\%$, $85\% \leq T \leq 92\%$ or $90\% \leq T \leq 92\%$;
- the film has an optical transmission T such that $60\% \leq T \leq 85\%$;
- the film has an optical transmission T such that $65\% \leq T \leq 85\%$, $70\% \leq T \leq 85\%$, $75\% \leq T \leq 85\%$, $80\% \leq T \leq 85\%$, $85\% \leq T \leq 85\%$ or $90\% \leq T \leq 85\%$;
- the film has a width of from 0.1 to 6 m;
- the film has a width of from 0.1 to 0.4 m, from 0.2 to 0.6 m, from 0.4 to 0.8 m, from 0.6 to 1.0 m, from 0.8 to 1.2 m, from 1 to 3 m, from 2 to 4 m, from 3 to 5 m or from 4 to 6 m;
- the film has a length of from 2 to 10 000 m;
- the film has a length of from 10 to 100 m, from 50 to 200 m, from 100 to 500 m, from 300 to 700 m, from 500 to 900 m, from 700 to 1100 m, from 1000 to 3000 m, from 2000 to 4000 m, from 3000 to 5000 m or from 4000 to 10 000 m;
- the film has a thickness of from 60 to 1400 μm;
- the film has a thickness of from 60 to 140 μm, from 100 to 180 μm, from 140 to 220 μm, from 180 to 300 μm, from 200 to 400 μm, from 300 to 500 μm, from 400 to 600 μm, from 500 to 700 μm, from 600 to 800 μm, from 700 to 900 μm, from 800 to 1000 μm, from 900 to 1100 μm, from 1000 to 1200 μm or from 1100 to 1400 μm;
- the film is thermoformable;
- the film is not oriented;
- the film is not stretched;
- the film comprises one or more layers which, independently of one another, consist of a polymeric material having a proportion by weight of from 60 to 99% by weight vinyl chloride polymer (VCP), based on the total weight of the layer;
- the film comprises one or more layers which consist of a polymeric material having a proportion by weight of from 60 to 99% by weight of vinyl chloride polymer (VCP), based on the total weight of the layer;
- the film comprises one or more layers which, independently of one another, consist of a polymeric material having a proportion by weight of from 60 to 99% by weight of polyvinylidene chloride (PVdC), based on the total weight of the layer;
- the film comprises one or more layers which, independently of one another, consist of a polymeric material having a proportion by weight of from 60 to 99% by weight of polyvinylidene chloride (PVdC), based on the total weight of the layer, and the one or more layers have a total weight per unit area of from 40 to 360 g·m$^{-2}$;
- the film comprises one or more layers which, independently of one another, consist of a polymeric material having a proportion by weight of from 60 to 99% by weight of polyvinylidene chloride (PVdC), based on the total weight of the layer, and the one or more layers have a total weight per unit area of from 40 to 80 g·m$^{-2}$, from 60 to 100 g·m$^{-2}$, from 80 to 120 g·m$^{-2}$, from 100 to 140 g·m$^{-2}$, from 120 to 160 g·m$^{-2}$, from 140 to 180 g·m$^{-2}$, from 160 to 200 g·m$^{-2}$, from 180 to 220 g·m$^{-2}$, from 200 to 240 g·m$^{-2}$, from 220 to 260 g·m$^{-2}$, from 240 to 280 g·m$^{-2}$, from 260 to 300 g·m$^{-2}$, from 280 to 320 g·m$^{-2}$, from 300 to 340 g·m$^{-2}$ or from 320 to 360 g·m$^{-2}$;
- the film comprises one or more layers which, independently of one another, consist of a polymeric material having a proportion by weight of from 60 to 99% by weight of polychlorotrifluoroethylene (PCTFE), based on the total weight of the layer;
- the film comprises one or more layers which, independently of one another, consist of a polymeric material having a proportion by weight of from 60 to 99% by weight of polyethylene (PE), based on the total weight of the layer;
- the film comprises one or more layers which, independently of one another, consist of a polymeric material having a proportion by weight of from 60 to 99% by weight of polyester, based on the total weight of the layer;
- the film comprises one or more layers which, independently of one another, consist of a polymeric material having a proportion by weight of from 60 to 99% by weight of polypropylene (PP), based on the total weight of the layer;
- the film comprises one or more layers which, independently of one another, consist of a polymeric material having a proportion by weight of from 60 to 99% by weight of cycloolefin copolymer (COC), based on the total weight of the layer;
- the film comprises one or more layers which, independently of one another, consist of a polymeric material having a proportion by weight of from 60 to 99% by weight of ethylene vinyl alcohol copolymer (EVOH), based on the total weight of the layer;
- the film comprises three adjacent layers which have the sequence PE/EVOH/PE, in each case consisting of a polymeric material having a proportion by weight of from 60 to 99% by weight of polyethylene (PE), from 60 to 99% by weight of ethylene-vinyl alcohol copolymer (EVOH) or from 60 to 99% by weight of polyethylene (PE), based on the total weight of the respective layer;
- the film comprises two, three, four, five, six, seven, eight, nine, ten or more layers, where at least two of the layers consist of different polymeric materials;

the film comprises two, three, four, five, six, seven, eight, nine, ten or more layers and one or more bonding layers, where a bonding layer is in each case arranged between two layers of the film;

the one or more main dyes absorb, independently of one another, light having wavelengths in the range from 520 to 540 nm, from 530 to 550 nm, from 540 to 570 nm, from 550 to 570 nm, from 560 to 580 nm, from 570 to 590 nm or from 580 to 600 nm;

the one or more main dyes have an integrated absorption of from 20 to 100% for light having wavelengths in the range from 520 to 600 nm, in each case based on the integrated absorption thereof for light having wavelengths in the range from 380 to 780 nm;

the one or more main dyes have an integrated absorption for light having wavelengths in the range from 520 to 600 nm of from 30 to 100%, from 40 to 100%, from 50 to 100%, from 60 to 100%, from 70 to 100%, from 80 to 100% or from 90 to 100%, in each case based on the integrated absorption thereof for light having wavelengths in the range from 380 to 780 nm;

the one or more main dyes have a specific absorption $\alpha_s$ in the wavelength range from 520 to 600 nm of from 20 to 100%;

the one or more main dyes have a specific absorption $\alpha_s$ in the wavelength range from 520 to 600 nm of from 30 to 100%, from 40 to 100%, from 50 to 100%, from 60 to 100%, from 70 to 100%, from 80 to 100% or from 90 to 100%;

the one or more main dyes have an integrated absorption for light having wavelengths in the range from 520 to 600 nm which is a factor of from 2 to 300 greater than the integrated absorption thereof for light having wavelengths in the range from 420 to 500 nm;

the one or more main dyes have an integrated absorption for light having wavelengths in the range from 520 to 600 nm which is a factor of from 2 to 10, from 5 to 20, from 10 to 30, from 20 to 40, from 30 to 50, from 40 to 60, from 50 to 70, from 60 to 80, from 70 to 90, from 80 to 100, from 90 to 110 or from 100 to 300, greater than the integrated absorption thereof for light having wavelengths in the range from 420 to 500 nm;

one or more of the polymeric materials contain, independently of one another, one or more supplementary dyes which absorb light having wavelengths in the range from 520 to 600 nm;

the one or more supplementary dyes absorb, independently of one another, light having wavelengths in the range from 520 to 540 nm, from 530 to 550 nm, from 540 to 570 nm, from 550 to 570 nm, from 560 to 580 nm, from 570 to 590 nm or from 580 to 600 nm;

the one or more supplementary dyes have an integrated absorption for light having wavelengths in the range from 520 to 600 nm of from 20 to 100%, in each cased based on the integrated absorption thereof for light having wavelengths in the range from 380 to 780 nm;

the one or more supplementary dyes have an integrated absorption for light having wavelengths in the range from 520 to 600 nm of from 30 to 100%, from 40 to 100%, from 50 to 100%, from 60 to 100%, from 70 to 100%, from 80 to 100% or from 90 to 100%, in each case based on the integrated absorption thereof for light having wavelengths in the range from 380 to 780 nm;

the one or more supplementary dyes have a specific absorption as in the wavelength range from 520 to 600 nm of from 20 to 100%;

the one or more supplementary dyes have a specific absorption $\alpha_s$ in the wavelength range from 520 to 600 nm of from 30 to 100%, from 40 to 100%, from 50 to 100%, from 60 to 100%, from 70 to 100%, from 80 to 100% or from 90 to 100%;

the one or more supplementary dyes have an integrated absorption for light having wavelengths in the range from 520 to 600 nm which is a factor of from 2 to 300 greater than the integrated absorption thereof for light having wavelengths in the range from 620 to 700 nm;

the one or more supplementary dyes have an integrated absorption for light having wavelengths in the range from 520 to 600 nm which is a factor of from 2 to 10, from 5 to 20, from 10 to 30, from 20 to 40, from 30 to 50, from 40 to 60, from 50 to 70, from 60 to 80, from 70 to 90, from 80 to 100, from 90 to 110 or from 100 to 300, greater than the integrated absorption thereof for light having wavelengths in the range from 620 to 700 nm;

one or more of the polymeric materials contain, independently of one another, one or more main dyes and one or more supplementary dyes;

the ratio of the integrated absorption of the one or more main dyes in the wavelength range from 520 to 600 nm to the integrated absorption of the one or more supplementary dyes in the wavelength range from 520 to 600 nm is in the range from 4:1 to 1:1;

the ratio of the integrated absorption of the one or more main dyes in the wavelength range from 520 to 600 nm to the integrated absorption of the one or more supplementary dyes in the wavelength range from 520 to 600 nm is in the range from 4:1 to 2:1 or from 3:1 to 1:1;

the one or more main dyes are, independently of one another, present in one or more of the layers;

the one or more main dyes are, independently of one another, present in one or more of the bonding layers;

the one or more main dyes are, independently of one another, present in one or more of the layers and in one or more of the bonding layers;

the one or more supplementary dyes are, independently of one another, present in one or more of the layers;

the one or more supplementary dyes are, independently of one another, present in one or more of the bonding layers;

the one or more supplementary dyes are, independently of one another, present in one or more of the layers and in one or more of the bonding layers; and/or the one or more main dyes and supplementary dyes are selected from the group consisting of EPOLIGHT® 5819, EPOLIGHT® 5821, EPOLIGHT® 5822, EPOLIGHT® 5391, EPOLIGHT® 5396, FDG-006®, FDG-007®, FDR-001®, HELIOGEN® Blue, Nilblue, HOSTAPRINT® Red HF2B 34, Solvent Blue 97, NOVOPERM® Red HF4B, Eosin Y, Cu-phthalocyanine, Rhodamine Blue, Rhodamine Red, Indigo carmine, Acid Blue 3, Acid Blue 25.

The invention further provides shaped bodies, for example blister films or shells, which have been produced from a film as described above by means of thermoforming.

The invention further provides a blister pack which comprises a blister part or a blister film which has been formed from a film as described above.

The invention further provides for the use of a film as described above for producing a blister part or a blister film for a blister pack.

The invention further provides a process for producing a single-layer or multilayer transparent film composed of one or more polymeric materials in one or more film plants, which comprises the steps:

(a) provision of one or more polymeric materials;
(b) provision of one or more dyes;
(c) mixing of the one or more dyes with one or more of the polymeric materials in predetermined proportions;
(d) plasticization of the one or more polymeric materials in one or more gelling apparatuses; and
(e) shaping of the one or more polymeric materials to give a film by means of extrusion, coextrusion, calendering, coating, extrusion coating and/or lamination;

characterized in that
the one or more dyes are added in such proportions that the film has CIE colour values $a^*$ and $b^*$ such that $-7 \le a^* \le 0$, $-15 \le b^* \le 0$ and an optical transmission T such that $60\% \le T \le 95\%$.

Advantageous embodiments of the process of the invention are characterized in that:

the one or more dyes are added in such proportions that the film has a CIE colour value $a^*$ such that $-7 \le a^* \le -5$, $-6 \le a^* \le -4$, $-5 \le a^* \le -3$, $-4 \le a^* \le -2$, $-3 \le a^* \le -1$ or $-2 \le a^* \le 0$;

the one or more dyes are added in such proportions that the film has a CIE colour value $a^*$ such that $-7 \le a^* \le -6$, $-6 \le a^* \le -5$, $-5 \le a^* \le -4$, $-4 \le a^* \le -3$, $-3 \le a^* \le -2$, $-3 \le a^* \le -2$ or $-1 \le a^* \le 0$;

the one or more dyes are added in such proportions that the film has a CIE colour value $b^*$ such that $-15 \le b^* \le -11$, $-13 \le b^* \le -9$, $-11 \le b^* \le -7$, $-9 \le b^* \le -5$, $-7 \le b^* \le -3$, $-5 \le b^* \le -1$ or $-3 \le b^* \le 0$;

the one or more dyes are added in such proportions that the film has a CIE colour value $b^*$ such that $-15 \le b^* \le -14$, $-14 \le b^* \le -13$, $-13 \le b^* \le -12$, $-12 \le b^* \le -11$, $-11 \le b^* \le -10$, $-10 \le b^* \le -9$, $-9 \le b^* \le -8$, $-8 \le b^* \le -7$, $-7 \le b^* \le -6$, $-6 \le b^* \le -5$, $-5 \le b^* \le -4$, $-4 \le b^* \le -3$, $-3 \le b^* \le -2$, $-2 \le b^* \le -1$ or $-1 \le b^* \le 0$;

the one or more dyes are present in one or more colouring additives;

the one or more dyes are mixed with the one or more polymeric materials in the one or more gelling apparatuses;

the one or more colouring additives are mixed with the one or more polymeric materials in the one or more gelling apparatuses;

the film plant is equipped with one or more regulatable metering devices for the one or more dyes;

the film plant is equipped with one or more regulatable metering devices for the one or more colouring additives;

the film plant is equipped with one or more devices for measuring the colour of the film;

the at least one device for measuring the colour of the film comprises a digital colour camera;

the at least one device for measuring the colour of the film is configured as a spectrophotometer and comprises a wavelength-dispersive optical component such as a grating or a prism;

the at least one device for measuring the colour of the film is designed and configured for detecting the transmission of light through the film;

the at least one device for measuring the colour of the film is designed and configured for detecting the transmission of light through the film as a function of the wavelength;

the film plant is equipped with one or more transmission sensors for measuring the optical transmission of the film;

the film plant is equipped with one or more spectrophotometers for measuring the optical transmission of the film;

the film plant is equipped with a control for the metering of the one or more dyes;

the film plant is equipped with a control for the metering of the one or more colouring additives;

the spectral transmission of the film is measured and transmitted as input signal to the electronic control;

the input signal of the spectral transmission of the film is evaluated digitally in the electronic control by means of a software program, converted into control signals and transmitted to the one or more metering devices for the one or more dyes;

the input signal of the spectral transmission of the film is evaluated digitally in the electronic control by means of a software program, converted into control signals and transmitted to the one or more metering devices for the one or more colouring additives;

the optical transmission of the film is measured and transmitted as input signal to the electronic control;

the input signal of the optical transmission of the film is evaluated digitally in the electronic control by means of a software program, converted into control signals and transmitted to the one or more metering devices for the one or more dyes; and/or the input signal of the optical transmission of the film is evaluated digitally in the electronic control by means of a software program, converted into control signals and transmitted to the one or more metering devices for the one or more colouring additives.

The invention further relates to a film which can be produced by a process having one or more of the above-described features.

Films according to the invention have a high transparency and are only slightly—at best hardly noticeable light blue—coloured. Even after prolonged irradiation with sunlight, which causes a yellow-orange discolouration in conventional films, no yellowing is perceptible in the films according to the invention.

For the purposes of the present invention, the term "film" refers to individual pieces of a film having dimensions of from 0.1 to 1 m and also industrially produced film webs having lengths of from several hundred to some thousands of metres.

For the purposes of the present invention, the term "polychlorotrifluoroethylene (PCTFE)" refers to homopolymers composed of chlorotrifluoroethylene units and copolymers containing chlorotrifluoroethylene units and, for example, vinylidene fluoride units.

For the purposes of the present invention, the term "polyethylene (PE)" refers to homopolymers composed of ethene units of the type PE-HD (HDPE), PE-LD (LDPE), PE-LLD (LLDPE), PE-HMW or PE-UHMW and also mixtures of the above types.

For the purposes of the present invention, the term "polypropylene (PP)" refers to homopolymers composed of propene units, copolymers composed of propene and ethene units and also mixtures of the above homopolymers and copolymers.

For the purposes of the present invention, the term "cycloolefin copolymer (COC)" refers to copolymers composed of cycloolefins such as norbornene with alk-1-enes such as ethene.

For the purposes of the present invention, the term "ethylene-vinyl alcohol copolymer (EVOH)" refers to copolymers of the monomers ethene and vinyl alcohol.

For the purposes of the present invention, the term "polyvinylidene chloride (PVdC)" refers to homopolymers of vinylidene chloride and copolymers of vinylidene chloride and one or more comonomers. Preference is given to using PVdC copolymers which consist of vinylidene chloride and one or more comonomers selected from the group consisting of vinyl chloride, acrylates, alkyl acrylates, alkyl methacrylates and acrylonitrile.

For the purposes of the present invention, the term "vinyl chloride polymers (VCP)" refers to vinyl chloride homopolymers, vinyl chloride copolymers and also mixtures of the above polymers. In particular, the term "vinyl chloride polymer" encompasses polyvinyl chlorides (PVC) produced by homopolymerization of vinyl chloride, vinyl chloride copolymers which are formed by copolymerization of vinyl chloride with one or more comonomers such as ethylene, propylene or vinyl acetate; and mixtures of the above homopolymers and copolymers.

For the purposes of the present invention, the term "polyester" refers to semicrystalline or amorphous homopolyesters or copolyesters. As semicrystalline or amorphous polyester, preference is given to using glycol-modified polyethylene terephthalate (PETG) or acid-modified polyethylene terephthalate. In particular, glycol units are replaced by 1,4-cyclohexanedimethanol units in the amorphous glycol-modified polyethylene terephtalate (PETG). Such a 1,4-cyclohexane-dimethanol-modified polyethylene terephthalate is commercially available from Eastman Chemical Company (Tennessee, USA) under the product name Eastar Copolyester 6763.

In a further advantageous embodiment of the invention, a semicrystalline or amorphous polyester having a crystallization half life of at least 5 minutes is used. Such a copolyester is described, for example, in the patent EP 1 066 339 B1 of Eastman Chemical Company. This copolyester is made up of (i) diacid moiety components and (ii) diol moiety components. The diacid moiety components (i) comprise at least 80 mol % of a diacid moiety component selected from among terephthalic acid, naphthalenedicarboxylic acid, 1,4-cyclohexanedicarboxylic acid, isophthalic acid and mixtures thereof, based on all diacid moiety components present in the copolyester (=100 mol %). The diol moiety components (ii) comprise from 80 to 100 mol % of a diol moiety component selected from among diols having from 2 to 10 carbon atoms and mixtures thereof and from 0 to 20 mol % of a modified diol selected from among 1,3-propanediol, 1,4-butanediol, 1,5-pentanediol, 1,6-hexanediol, 1,8-octanediol, 2,2,4-trimethyl-1,3-pentanediol, propylene glycol, 2,2,4,4-tetramethyl-1,3-cyclobutanediol, based on all diol moieties present in the copolyester (=100 mol %). Amorphous or semicrystalline copolyesters having a crystallization half life of at least 5 minutes are well suited to conventional calendering processes. Homogeneous and virtually defect-free films can be produced from a polymeric material containing a substantial proportion, generally more than 50% by weight, of semicrystalline or amorphous copolyester having a crystallization half life of at least 5 minutes by calendering.

Amorphous or semicrystalline polyesters having a crystallization half life of at least 5 minutes are commercially available from, inter alia, Eastman Chemical Company under the product name CADENCE™ Copolyester. These copolyesters are used as main component for producing polyester films, with the proportion thereof based on the total weight of the polyester film generally being from more than 40 to 70% by weight.

The crystallization half life of the copolyesters used for the film is determined by means of a differential scanning calorimeter (DSC). Differential scanning calorimetry (DSC) is a standard method for measuring the thermal properties, in particular the phase transition temperatures, of solids. For the purposes of the present invention, the crystallization half life is determined by heating 15 mg of the copolyester to be measured to 290° C., subsequently cooling it in the presence of helium at a rate of 320° C. per minute to a predetermined temperature in the range from 180 to 210° C. and detecting the time to attainment of the isothermal crystallization temperature or the crystallization peak of the DSC curve. The crystallization half life is determined from the curve of crystallization against time. The crystallization half life corresponds to the time required at the predetermined temperature in the range from 180 to 210° C. after the initial phase of crystallization in order to obtain 50% of the maximum achievable crystallinity in the sample.

In advantageous embodiments of the film according to the invention, two or more layers are, independently of one another, joined to one another by the same or different bonding agents. As bonding agents, preference is given to using polyurethanes or acrylates which contain hydrolysis groups, with or without crosslinking by polyisocyanates. In some production processes, for example coextrusion, it is in some cases possible to join layers of different polymers directly, i.e. without bonding agents.

For the purposes of the present invention, the term "dye" refers to compounds, in particular organic molecules, which selectively absorb light having wavelengths in a prescribed region of the visible spectrum of from 380 to 780 nm.

For the purposes of the present invention, the term "colouring additive" refers to viscous or solid materials, e.g. solutions, dispersions, pigments and masterbatches, which comprise one or more organic and/or polymeric carrier materials and one or more dyes dissolved or dispersed therein.

For the purposes of the present invention, the term "absorption coefficient" refers to the linear attenuation coefficient of a material for electromagnetic radiation in the wavelength range of visible light from 380 to 780 nm (https://de.wikipedia.org/wiki/Absorptionskoeffizient). The absorption coefficient is, in accordance with customary terminology, abbreviated by the Greek letter "$\alpha$". According to the Lambert-Beer law, the intensity I(z) of light having an initial intensity $I_0$ decreases exponentially with the path length z after passing through an absorber having an absorption coefficient $\alpha$ according to the equation $I(z) = I_0 \cdot e^{-\alpha \cdot z}$. The product $\alpha \cdot z$ or $\alpha \cdot d$ of the absorption coefficient $\alpha$ and the path length z or the thickness d of a body through which light passes, in particular a film, is referred to as "optical density" or denoted by the symbol "E" (cf. https://de.wikipedia.org/wiki/Extinktion_(Optik)).

For the purposes of the present invention, the terms "integrated absorption" and "integrated optical density" refer to the integrals of the absorption coefficient $\alpha$ and, respectively, the optical density E of a material, in particular a dye, over a prescribed wavelength range $[\lambda_a, \lambda_b]$ of the visible spectrum. The ratio of the "integrated absorption" or the "integrated optical density" in a prescribed wavelength range $[\lambda_a, \lambda_b]$ and the "integrated absorption" or "integrated optical density" over the entire visible wavelength range from 380 to 780 nm is referred to as "specific absorption $\alpha_s$", where $$\alpha_s(\lambda_a, \lambda_b) = \frac{\int_{\lambda_a}^{\lambda_b} \alpha(\lambda) d\lambda}{\int_{380\,nm}^{780\,nm} \alpha(\lambda) d\lambda} = \frac{\int_{\lambda_a}^{\lambda_b} E(\lambda) d\lambda}{\int_{380\,nm}^{780\,nm} E(\lambda) d\lambda}$$

and 380 nm≤$\lambda_a$<$\lambda_b$≤780 nm. The "specific absorption $\alpha_s$" serves to assign a dye quantitatively to a wavelength range [$\lambda_a$, $\lambda_b$] having a dominant absorption and for the purposes of the present invention replaces the customary qualitative designation by means of a colour complementary to the wavelength range [$\lambda_a$, $\lambda_b$] (https://de.wikipedia.org/wiki/Komplementärfarbe).

For the purposes of the present invention, the colour values a* and b* of a film are measured in remission with the aid of a spectrophotometer in accordance with DIN EN ISO 11664-1:2011-07, DIN EN ISO 11664-2:2011-07 and DIN EN ISO 11664-3:2013-08 using standard light CIE D65, 10° field of view and sensitivity or tristimulus curves $\bar{x}$, $\bar{y}$, $\bar{z}$ of the CIE standard valence system of 1931. For the colour measurement, the film is arranged on a calibrated, diffusely reflecting white standard scattering plate made of SPECTRALON®. In this measurement arrangement, the light emitted by the light source passes twice through the film before it enters into the spectrophotometer.

For the purposes of the present invention, the term "optical transmission" refers to the total transmittance $\bar{T}$ averaged over the visible wavelength range:

$$\bar{T} = \frac{1}{400\,nm} \int_{380\,nm}^{780\,nm} T(\lambda) d\lambda$$

where $T(\lambda)$ is the total transmittance of the film at the wavelength λ. The total transmittance $T(\lambda)$ as a function of the wavelength λ is determined in accordance with DIN EN ISO 13468-2:2006-07 using a spectrophotometer for detecting the transmitted light (e.g. a Shimadzu UV-3600 Plus spectrophotometer). To measure the total transmittance $T(\lambda)$, a collimated beam of incident light having an intensity $I_0(\lambda)$ is directed in a perpendicular direction onto the surface of the film. The incident light beam is partially reflected at the two surfaces of the film. The sum of the reflected intensities, which in the case of polymer films is typically from about 8% to 10%, is referred to as $I_R(\lambda)$. While the incident light beam is passing through the film, the intensity is additionally decreased due to absorption $I_A$, forward scattering $I_{FS}$ and backscattering Is. In embodiments in which the surface of the film is rough, the transmitted light is scattered to a high degree. Accordingly, the measured total transmittance $T(\lambda)$ can be described by the following equation $$T(\lambda) = c \cdot [I_0(\lambda) - I_R(\lambda) - I_{BS}(\lambda)]/I_0(\lambda)$$

where c is a factor which is determined by careful calibration of the instrument, e.g. by measuring the total transmittance $T(\lambda)$ without film. The optical transmission, i.e. the average total transmittance $\bar{T}$, is obtained by averaging $T(\lambda)$ over the visible wavelength range from 380 to 780 nm, according to the relationship $$\bar{T} = \frac{1}{400\,nm} \int_{380\,nm}^{780\,nm} T(\lambda) d\lambda.$$

For the purposes of the present invention, the content of a dye in a film is for practical reasons not specified in amount-based units of [% by weight] or [mol %] but instead as its optical density $E(\lambda) = \alpha(\lambda) \cdot d$, where d is the thickness of the film. The optical density $E(\lambda)$ characterizes the effect of a dye independently of the nature and thickness d of the respective film. Reporting of the optical density $E(\lambda)$ approaches industrial practice, in which the proportion of a dye-containing colouring additive is set with the aid of colour measurements.

In the polymer processing industry, colouring additives rather than pure dyes are used virtually without exception. Colouring additives comprise one or more dyes dissolved or dispersed in an organic or polymeric carrier. Accordingly, colouring additives are classified as solution, dispersion, pigment or masterbatch. The proportion of a dye in a colouring additive in units of [% by weight] or [mol %] is usually not quantified by the producers of the colouring additives and is subject to changes. For this reason, the proportion of a colouring additive in a polymeric material is in industrial practice determined empirically by measuring the colour of an article, extrudate or film produced.

The empirical determination of the proportion of a dye or colouring additive is also necessary because numerous dyes are subject to appreciable degradation at the elevated temperature in the production process.

The optical density $E(\lambda)$ reported in the present invention can easily be measured by means of the natural logarithm of the ratio of the spectral transmission $T_F(\lambda)$ of a film containing the dye or a colouring additive comprising the dye and the spectral transmission $T_0(\lambda)$ of a film having a thickness of d produced in the same way without the dye or without the colouring additive, according to the relationship $$E(\lambda) = \ln\left[\frac{T_F(\lambda)}{T_0(\lambda)}\right].$$

In the measurement and reporting of the optical density $E(\lambda)$, the influence of the organic or polymeric carrier materials present in the colouring additives can be disregarded because
- the carrier material has a vanishingly small absorption coefficient (α~0) in the visible wavelength range from 380 to 780 nm; and
- the proportion of the colouring additive and thus of the carrier material in the polymeric material is generally less than 2% by weight.

Furthermore, it has to be taken into account that polymeric films and other articles are produced industrially by means of continuous processes such as extrusion, coextrusion, calendering, coating, extrusion coating and/or lamination, with one or more polymeric materials, usually in the form of pellets, and also solid or viscous colouring additives being fed continuously into a gelling apparatus, for example a kneader or extruder. The amount of the colouring additive introduced is regulated with the aid of on-line colour measurement and an electronic control. Only continuous colour measurement in combination with regulated metering-in of the colouring additives makes it possible to adhere to colour tolerances in accordance with ISO/CIE 11664-6 of, for example, $\Delta E_{00} \leq 2$ or $\Delta E_{00} \leq 1$ (https://de.wikipedia.org/wiki/Delta_E) in industrially produced films having a length of up to 10 000 m per roll.

For the above reasons, it is neither practicable nor advantageous to indicate the dye content of films according to the invention in amount-based units of [% by weight] or [mol %]. Instead, the optical density $E(\lambda)=\alpha(\lambda)\cdot d$ is reported for the purposes of the present invention. Unless specified otherwise, the optical density $E(\lambda)$ of a colouring additive or of a dye reported in the context of the present invention is based on a measurement in a three-layer film consisting of a first layer of polyvinyl chloride (PVC) having a thickness of 250 mm, a second layer of polyvinylidene chloride (PVdC) having a weight per unit area of 120 g·m$^{-2}$ (corresponding to a thickness of 71 µm) and a third layer of polyethylene (PE) having a thickness of 30 µm.

In order to obtain an optical density $E(\lambda)$ of a dye or colouring additive as specified in the present invention or deviating therefrom in any film, a person skilled in the art of polymer technology will measure the spectral transmission of two or more films having the same thickness with and without a prescribed proportion of the colouring additive; or the same proportion of the colouring additive and differing thicknesses;

where the films otherwise consist of identical polymeric materials.

For example, a person skilled in the art will make two films $F_1$ and $F_2$ composed of PVC or PET having the same thickness d, where the first film $F_1$ does not contain any colouring additive and the second film $F_2$ contains a predetermined proportion of a colouring additive, measure the spectral transmission $T_1(\lambda)$ and $T_2(\lambda)$, respectively, thereof and calculate the optical density $E(\lambda)$ of the dye or colouring additive according to the relationship $$E(\lambda) = \ln\left[\frac{T_2(\lambda)}{T_1(\lambda)}\right].$$

With a knowledge of the thickness d, the absorption coefficient $\alpha(\lambda)$ can then be calculated according to $E(\lambda)=\alpha(\lambda)\cdot d$. The absorption coefficient $\alpha(\lambda)$ is in turn directly proportional to the proportion of the dye or colouring additive. A person skilled in the art thus has the parameters required to set the proportion of the colouring additive in a film having any composition and thickness in such a way that the film has a predetermined optical density $E(\lambda)$.

As an alternative, a person skilled in the art will, for example, make a film composed of PVC or PET having a predetermined proportion of a selected colouring additive and measure the thickness d thereof and also the spectral transmission and optical density $E(1\times d; \lambda), \ldots, E(n\times d; \lambda)$ of single and multiple film stacks having a thickness of $1\times d, \ldots, n\times d$ where $n=2, 3, \ldots$ and determine the absorption coefficient $\alpha(\lambda)$ by linear regression of the optical density $E(j\times d; \lambda)$ as a function of the thickness $j\times d$ where $1 \leq j \leq n$. Preference is given to using, for example, polycarbonate (PC) or polymethyl methacrylate (PMMA) as polymeric material for the films $F_1$ and $F_2$. In the visible wavelength range from 380 to 780 nm, PC and PMMA have a virtually constant transmission, i.e. a negligible absorption, for layer thicknesses of up to 10 mm and serve as "invisible" matrix for the dye or a colouring additive containing the dye.

Apart from deviating temperatures in the production process and more or less severe degradation of a dye associated therewith, the values determined by the above method for the optical density $E(\lambda)$ and the absorption coefficient $\alpha(\lambda)$ can readily be carried over by means of an appropriately selected correction factor for the thickness and/or the proportion to a film of any composition and thickness.

In the development of the films according to the invention, it was found to be extremely difficult to find dyes or dye combinations by means of which CIE colour values a* and b* such that $-7 \leq a^* \leq 0$, $-15 \leq b^* \leq 0$ and at the same time a high transparency could be achieved. Dyes by means of which b* can be reduced to values in the range $-15 \leq b^* \leq 0$ also mostly bring about a considerable reduction in a* to values of $a^* < -15$ and thus a greenish colouration of the film which can give an observer the impression of, for example, an algal-type growth. In order to increase a* to values in the range $-7 \leq a^* \leq 0$, it is therefore generally necessary to employ an additional dye which reduces the transparency and/or, for example, causes an undesirable violet discolouration. To discover suitable dyes and combinations thereof, the inventors have developed a method or mathematical model which is explained briefly below.

The form or profile of the optical density $E(\lambda)$ or of the absorption coefficient $\alpha(\lambda)$ as a function of the wavelength $\lambda$ is critical for the colour effect of a dye. The inventors have developed an empirical method by means of which the change in the colour values $\Delta a^*$ and $\Delta b^*$ can be calculated to a good approximation with the aid of the optical density $E(\lambda)$. The calculation method is presented briefly below:

$$\Delta a^* = -0.39 + \int_{380\,nm}^{780\,nm} \left(1 - e^{-2\cdot E(\lambda)}\right) F_a(\lambda) d\lambda$$

$$\Delta b^* = -0.54 + \int_{380\,nm}^{780\,nm} \left(1 - e^{-2\cdot E(\lambda)}\right) F_b(\lambda) d\lambda$$

$$F_a(\lambda) = \frac{1}{1\,\text{nm}} \sum_{i=1}^{3} \frac{h_i}{\sqrt{2\pi\sigma_i^2}} e^{-\frac{1}{2}\left(\frac{\lambda-\mu_i}{\sigma_i}\right)^2}$$

| i | $h_i$ | $\mu_i$ | $\sigma_i$ |
|---|-------|---------|------------|
| 1 | −17.66 | 447.59 | 18.63 |
| 2 | 50.7 | 532.38 | 28.16 |
| 3 | −32.65 | 608.57 | 26.28 | and $$F_b(\lambda) = \frac{1}{1\,\text{nm}}\left[\frac{k_1}{\sqrt{2\pi\tau_1^2}} e^{-\frac{1}{2}\left(\frac{\lambda-\nu_1}{\tau_1}\right)^2} + \frac{k_2}{\sqrt{2\pi\tau_2^2}} e^{-\frac{1}{2}\left(\frac{\lambda-\nu_2}{\tau_2}\right)^2} \frac{\alpha_2}{\sqrt{2\pi\tau_2^2}} \int_{-\infty}^{\lambda} e^{-\frac{1}{2}\frac{\alpha_2^2(\chi-\nu_2)^2}{\tau_2^2}} d\chi\right]$$

| i | $k_i$ | $\nu_i$ | $\tau_i$ | $\alpha_2$ |
|---|-------|---------|----------|------------|
| 1 | 38.35 | 451.59 | 20.33 | — |
| 2 | −76.42 | 521.23 | 57.98 | 2.44 |

Figure 6:
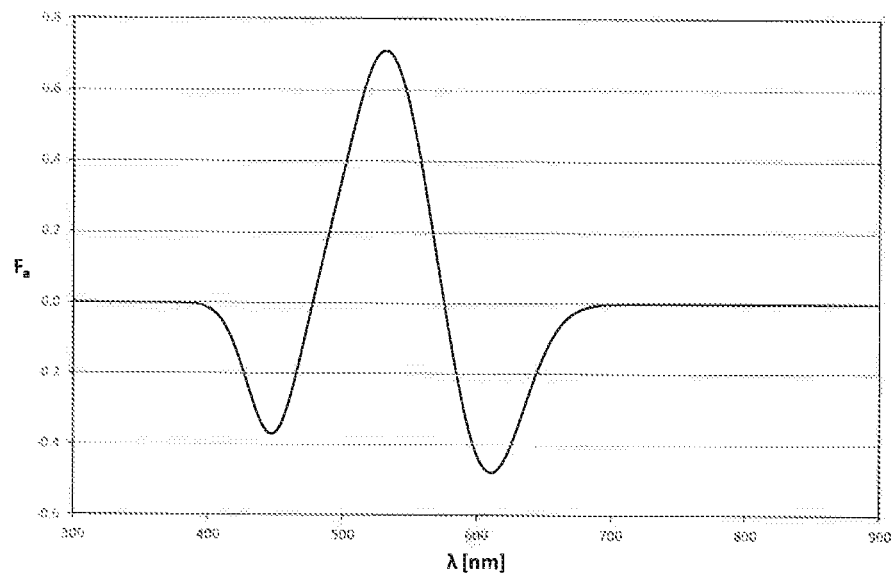
FIG. 6 is the curve of a function $F_a(\lambda)$ for the empirical calculation of the color change $\Delta a^*$.
Figure 7:
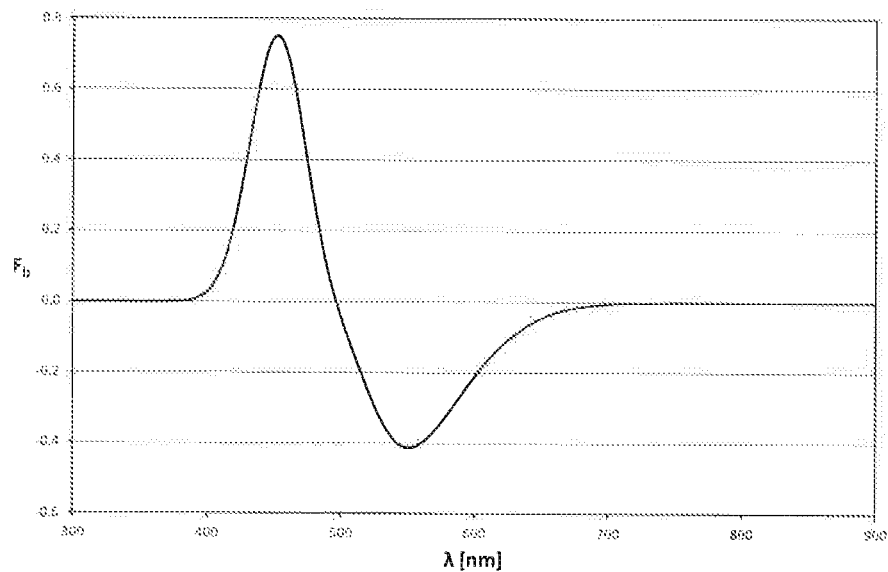
FIG. 7 is the curve of a function $F_b(\lambda)$ for the empirical calculation of the color change $\Delta b^*$.

The curve of the wavelength-dependent functions $F_a(\lambda)$ and $F_b(\lambda)$ is shown in FIGS. 6 and 7 and corresponds to a sequence of three symmetric Gaussian curves or a sequence of a symmetric Gaussian curve and an asymmetric Gaussian curve with alternating signs.

Furthermore, it should be noted that base polymers used in industrial film production, for example vinyl chloride polymer (VCP), polyvinylidene chloride (PVdC), polyester, polychlorotrifluoroethylene (PCTFE), polyethylene (PE), polypropylene (PP), cycloolefin copolymer (COC) and ethylene-vinyl alcohol copolymer (EVOH), have a small and essentially wavelength-independent absorption coefficient in the visible wavelength range from 380 to 780 nm. The empirical calculation method for the colour change $\Delta a^*$ and $\Delta b^*$ developed by the inventors now makes it possible to check the effect of a colouring additive or dye having an optical density $E(\lambda)$ and adapt it to target values.

The dyes used for the purposes of the present invention are listed in Table 1. The chemical empirical formula and structural formula of each dye is indicated where known. In a number of cases, the suppliers or manufacturers of a dye do not disclose the chemical structure thereof. In these cases (and also others), the functional dependence of the optical density $E(\lambda)$ or of the absorption coefficient $\alpha(\lambda)$ on the wavelength $\lambda$ is therefore specified in the form of graphs (see FIGS. 8-10) and tables of values.

TABLE 1

| No. | Name | Empirical formula | Structural formula |
|---|---|---|---|
| #1 | EPOLIGHT ® 5819 | — | — |
| #2 | EPOLIGHT ® 5821 | — | — |
| #3 | EPOLIGHT ® 5822 | — | — |
| #4 | EPOLIGHT ® 5391 | — | — |
| #5 | EPOLIGHT ® 5396 | — | — |
| #6 | FDG-006 ® | — | — |
| #7 | FDG-007 ® | — | — |
| #8 | FDR-001 ® | — | — |
| #9 | HELIOGEN ® Bleu | $C_{32}H_{18}N_8$ | 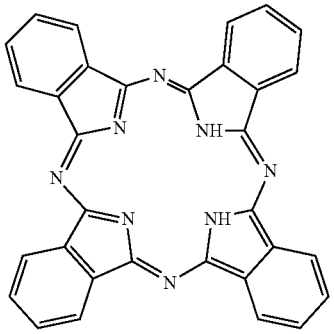 [SMILES: c1ccc2c(c1)-c1nc3nc(nc4[nH]c(nc5[nH]c(nc-2n1)c1ccccc51)c1ccccc41)-c1ccccc1-3] |
| #10 | Nilblue | $C_{20}H_{20}N_3O^+$ | 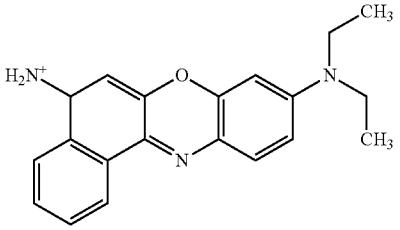 [SMILES: CCN(CC)c1ccc2c(c1)OC1=CC([NH3+])c3ccccc3C1=N2] |
| #11 | HOSTAPRINT ® Red HF2B 34 | $C_{29}H_{25}N_5O_5$ | 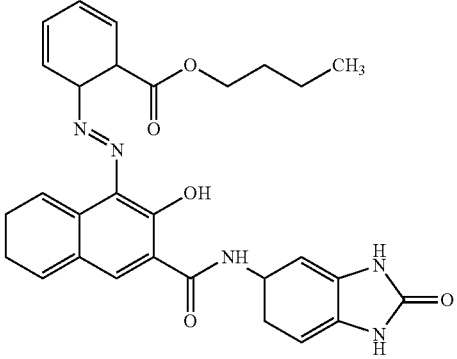 [SMILES: CCCCOC(=O)C1C=CC=CC1/N=N/c1c(O)c(C(=O)NC2C=c3[nH]c(=O)[nH]c3=CC2)cc2c1=CCCC=2] |

TABLE 1-continued

| No. Name | Empirical formula | Structural formula |
| --- | --- | --- |
| #12 Solvent Blue 97 | $C_{36}H_{38}N_2O_2$ | |
| #13 NOVOPERM® Red HF4B | $C_{34}H_{28}ClN_5O_7$ | |
| #14 Eosin Y | $C_{20}H_6Br_4Na_2O_5$ | |
| #15 Cu-phthalocyanine | $C_{32}H_{16}CuN_8$ | |

TABLE 1-continued
| No. | Name | Empirical formula | Structural formula |
|---|---|---|---|
| #16 | Rhodamine Blue | $C_{28}H_{31}ClN_2O_3$ | 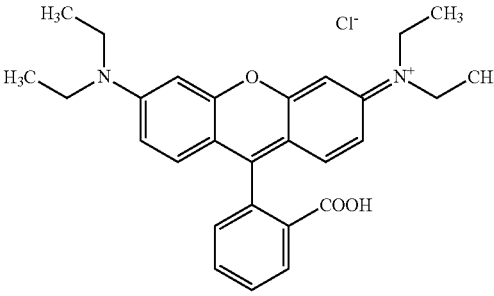 |
| #17 | Rhodamine Red | $C_{31}H_{29}ClN_2O_6S_2$ | 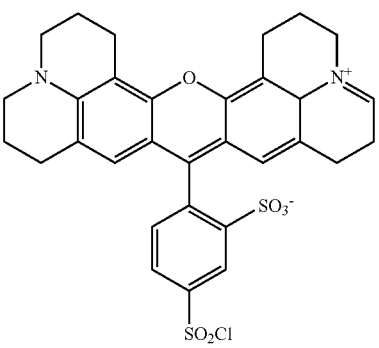 |
| #18 | Indigo carmine | $C_{16}H_8N_2Na_2O_8S_2$ | 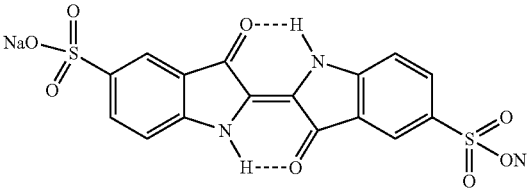 |
| #19 | Acid Blue 3 | $C_{27}H_{31}N_2O_6S_2Na$ | 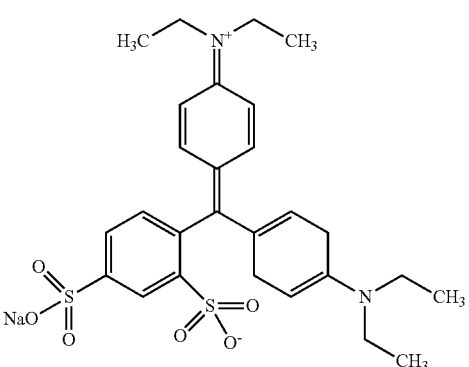 |
| #20 | Acid Blue 25 | $C_{20}H_{13}N_2NaO_5S$ | 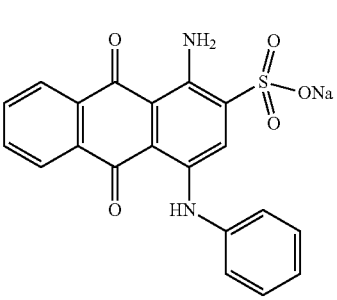 |

Colouring additives which contain dyes having the product names indicated in Table 1 are produced and/or supplied by
EPOLIGHT® Epolin Co.
FDG-006 . . . Yamada Chemical Co. Ltd.
FDG-007 . . . Yamada Chemical Co. Ltd.
FDR-001 . . . Yamada Chemical Co. Ltd.
HELIOGEN® BASF SE
HOSTAPRINT® Clariant SE
NOVOPERM® Clariant SE
Some of the dyes used have the following CAS numbers:
HELIOGEN® Blue . . . CAS No. 574-93-6
Nilblue . . . CAS No. 3625-57-8
HOSTAPRINT® Red HF2B 34 . . . CAS No. 31778-10-6
Solvent Blue 97 . . . CAS No. 61969-44-6
NOVOPERM® Red HF4B . . . CAS No. 59487-23-9
Eosin Y . . . CAS No. 17372-87-1
Cu-phthalocyanine . . . CAS No. 147-14-8
Rhodamine Blue . . . CAS No. 81-88-9
Rhodamine Red . . . CAS No. 82354-19-6
Indigo carmine . . . CAS No. 860-22-0
Acid Blue 3 . . . CAS No. 20262-76-4
Acid Blue 25 . . . CAS No. 6408-78-2

Figure 2:
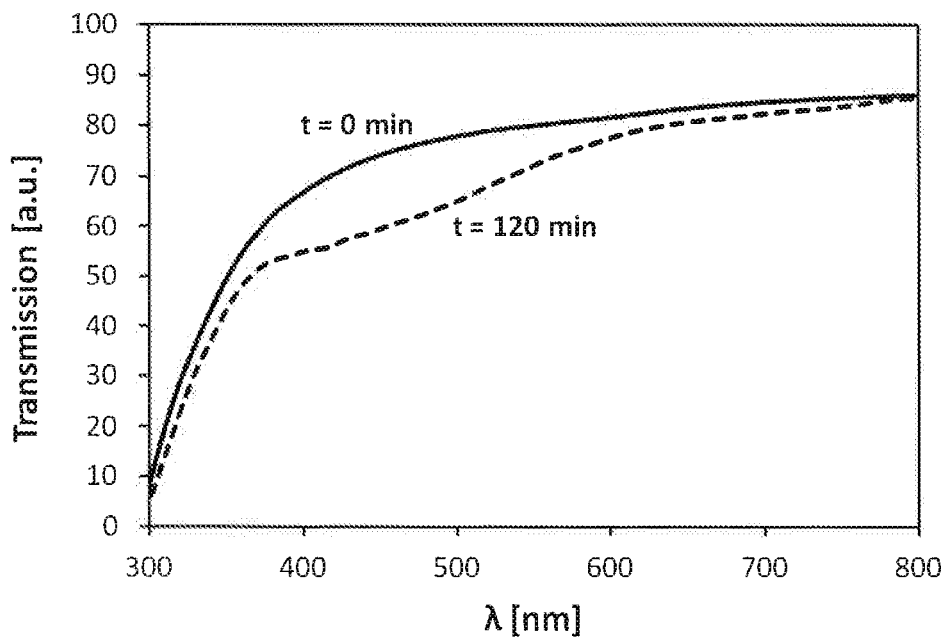
FIG. 2 is a graphical illustration of a transmission spectra of an exemplary film before and after UV irradiation in an irradiation chamber.
Figure 3:
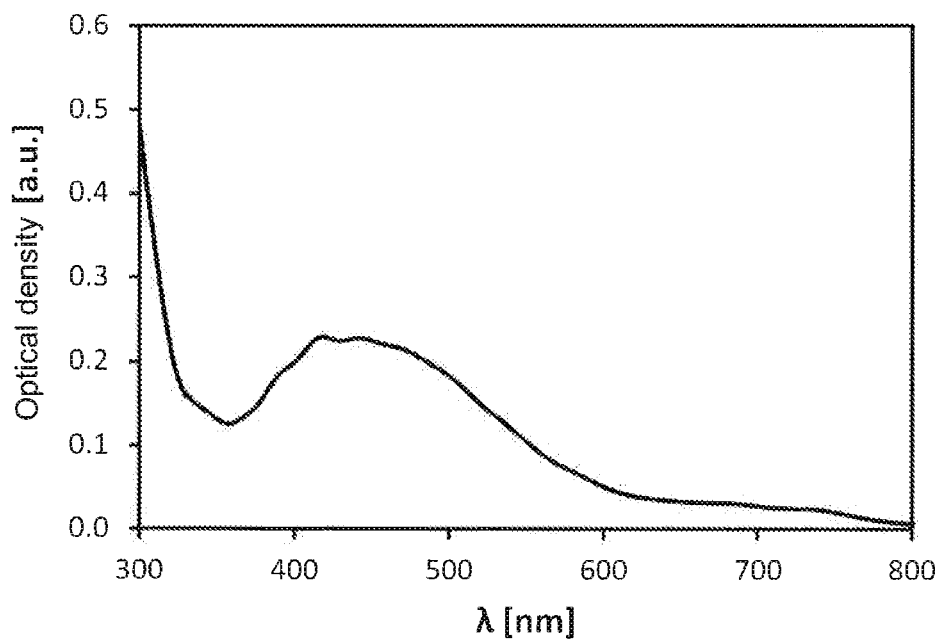
FIG. 3 is a graphical illustration of the absorbance of the exemplary film in FIG. 2 caused by UV irradiation, presented as absorption coefficient or optical density.
Figure 4:
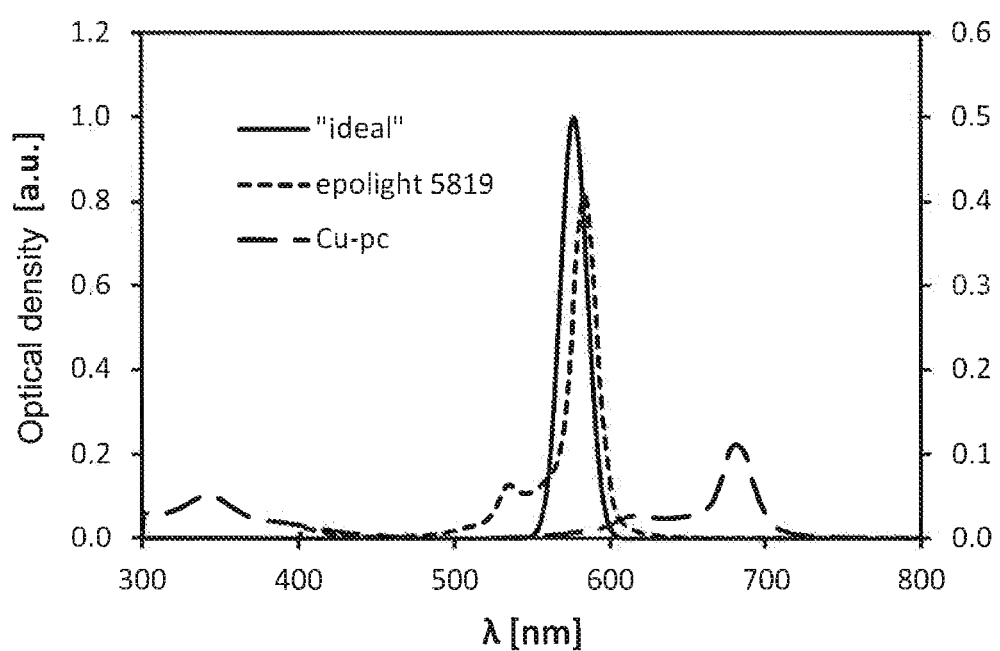
FIG. 4 is a graphical illustration of the absorption coefficients of an ideal dye according to the invention and also two commercial dyes.
Figure 5:
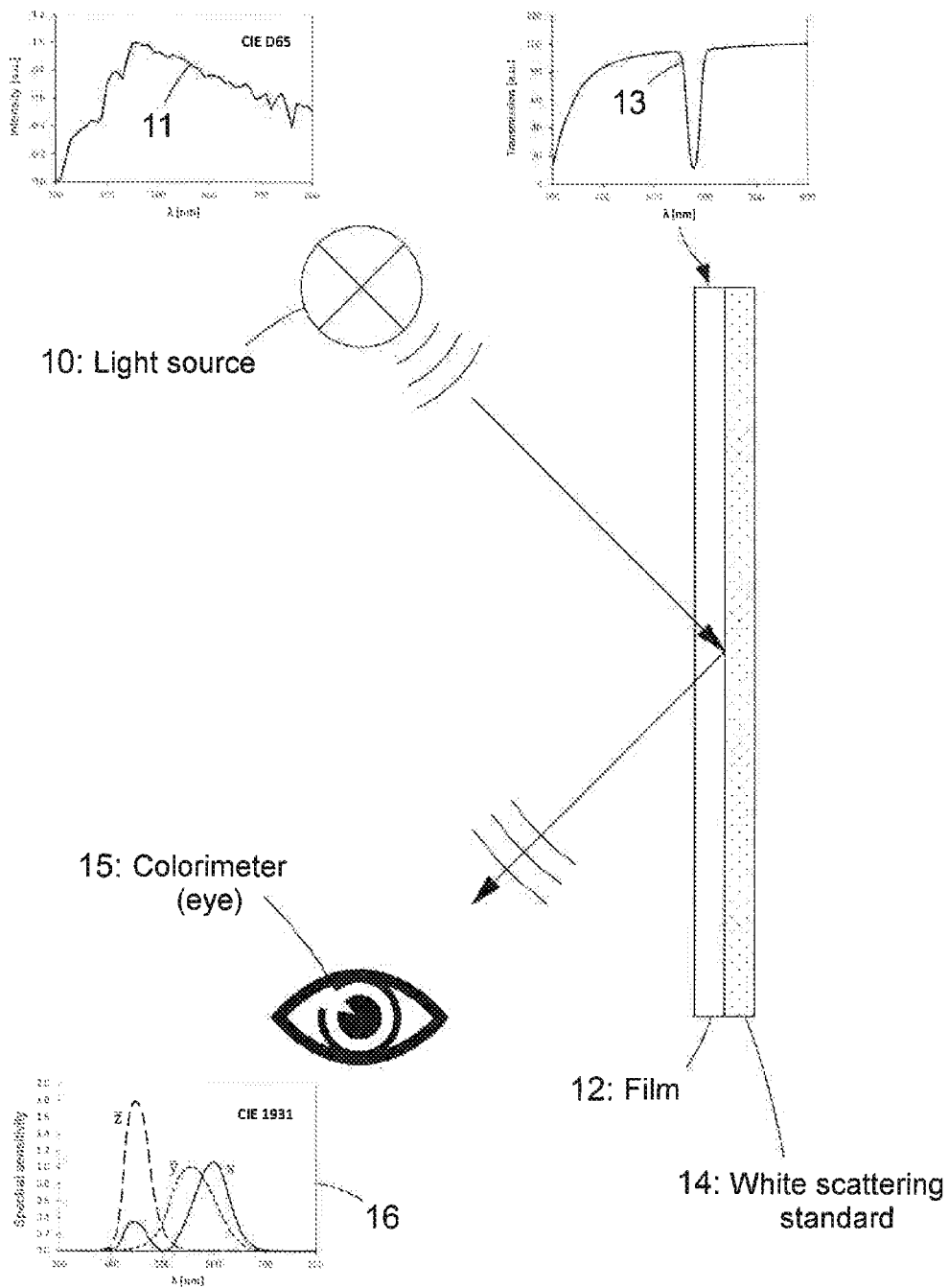
FIG. 5 is a schematic depiction of the instrumental and visual colour measurement or perception.
Figure 8:
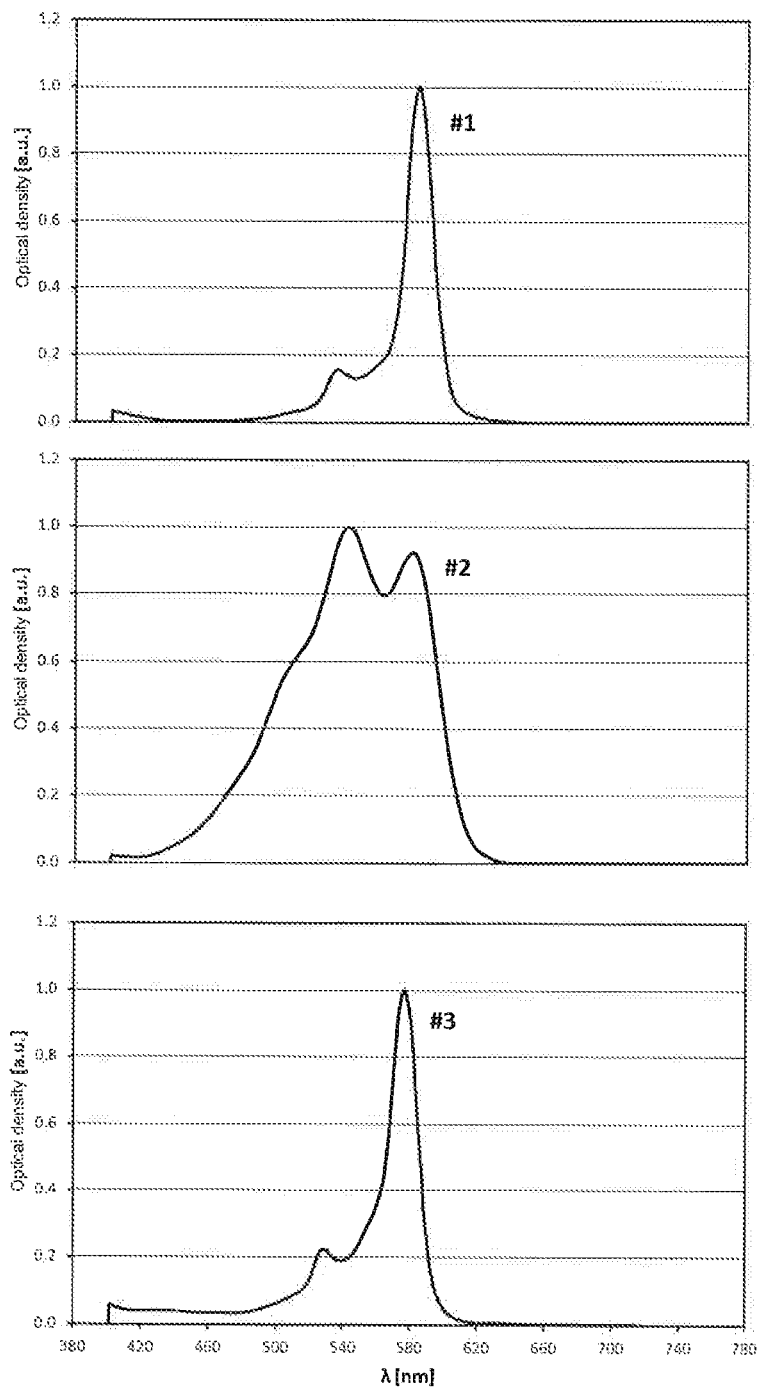
FIG. 8 is a graphical illustration of the absorption coefficients of the dyes #1 to #3.
Figure 9:
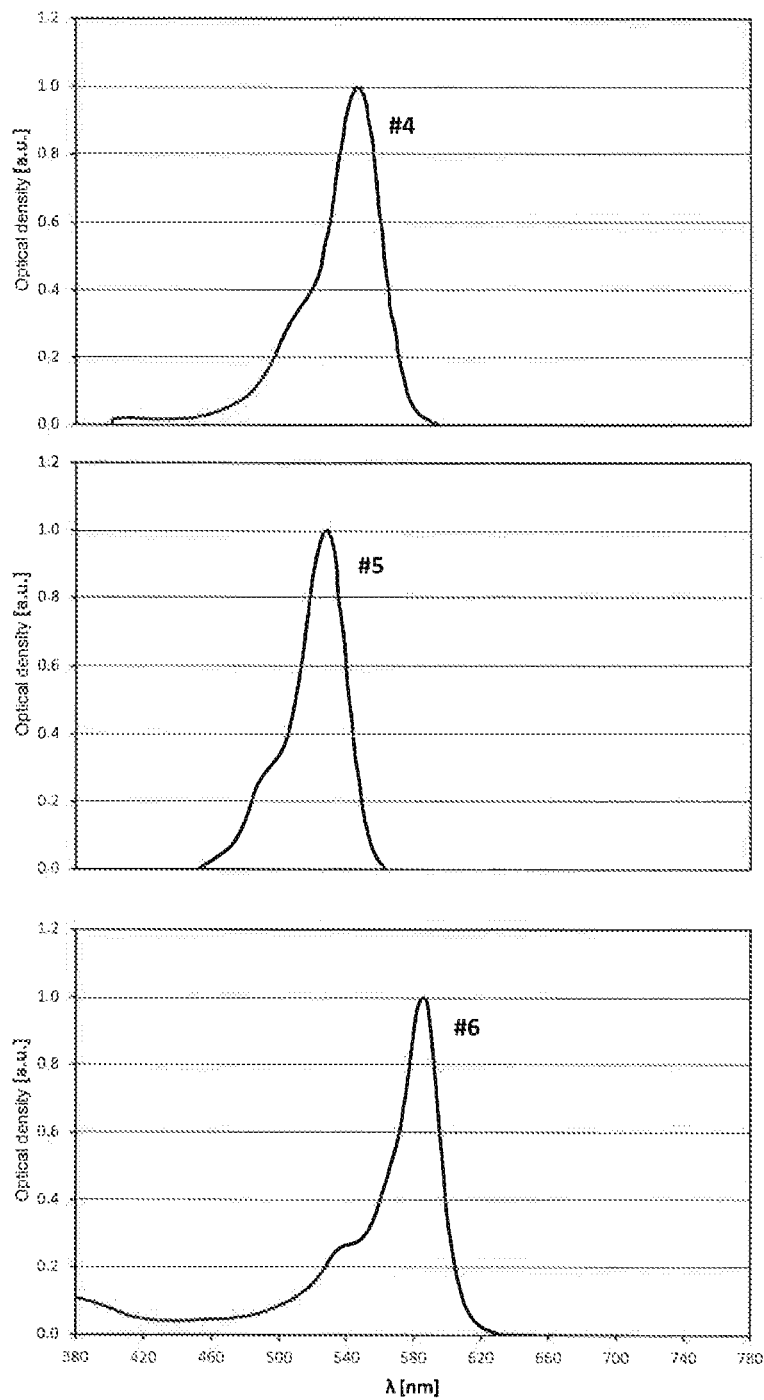
FIG. 9 is a graphical illustration of the absorption coefficients of the dyes #4 to #6.
Figure 10:
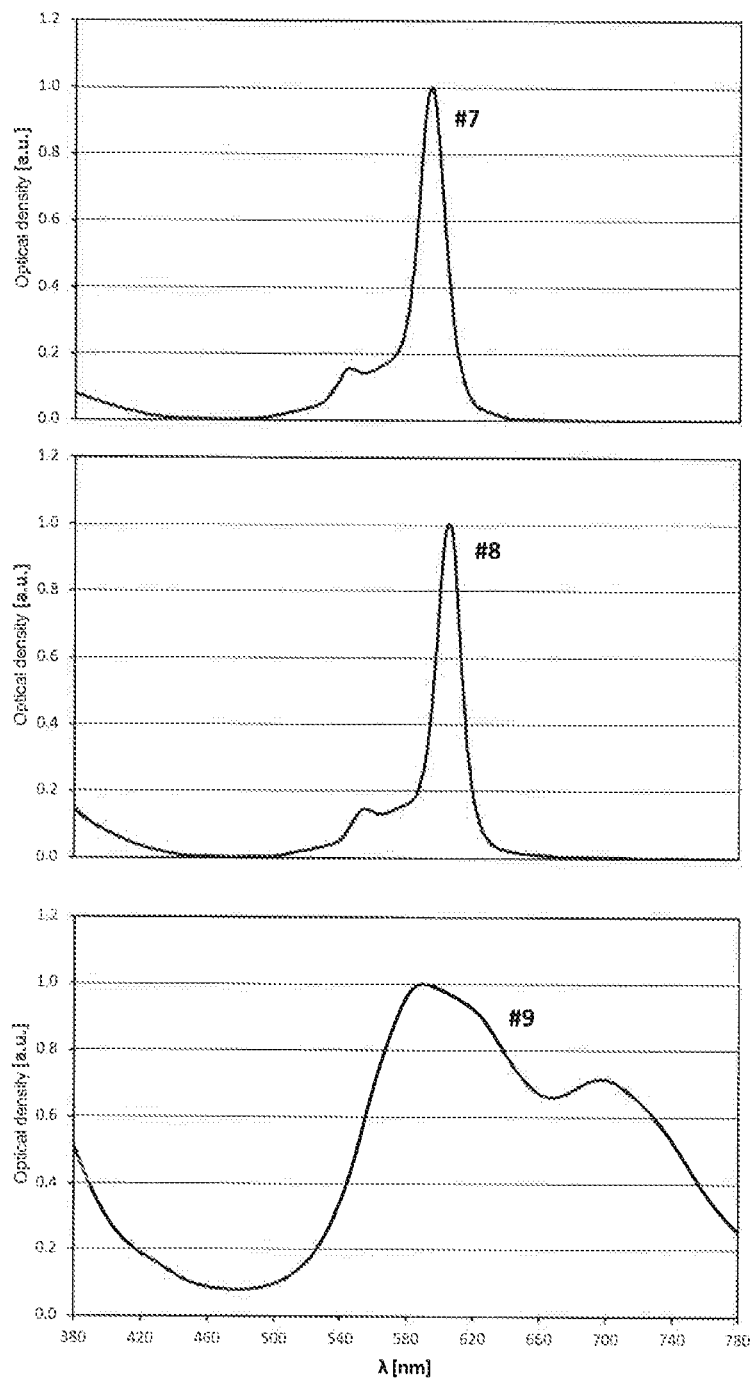
FIG. 10 is a graphical illustration of the absorption coefficients of the dyes #7 to #9.
Figure 11:
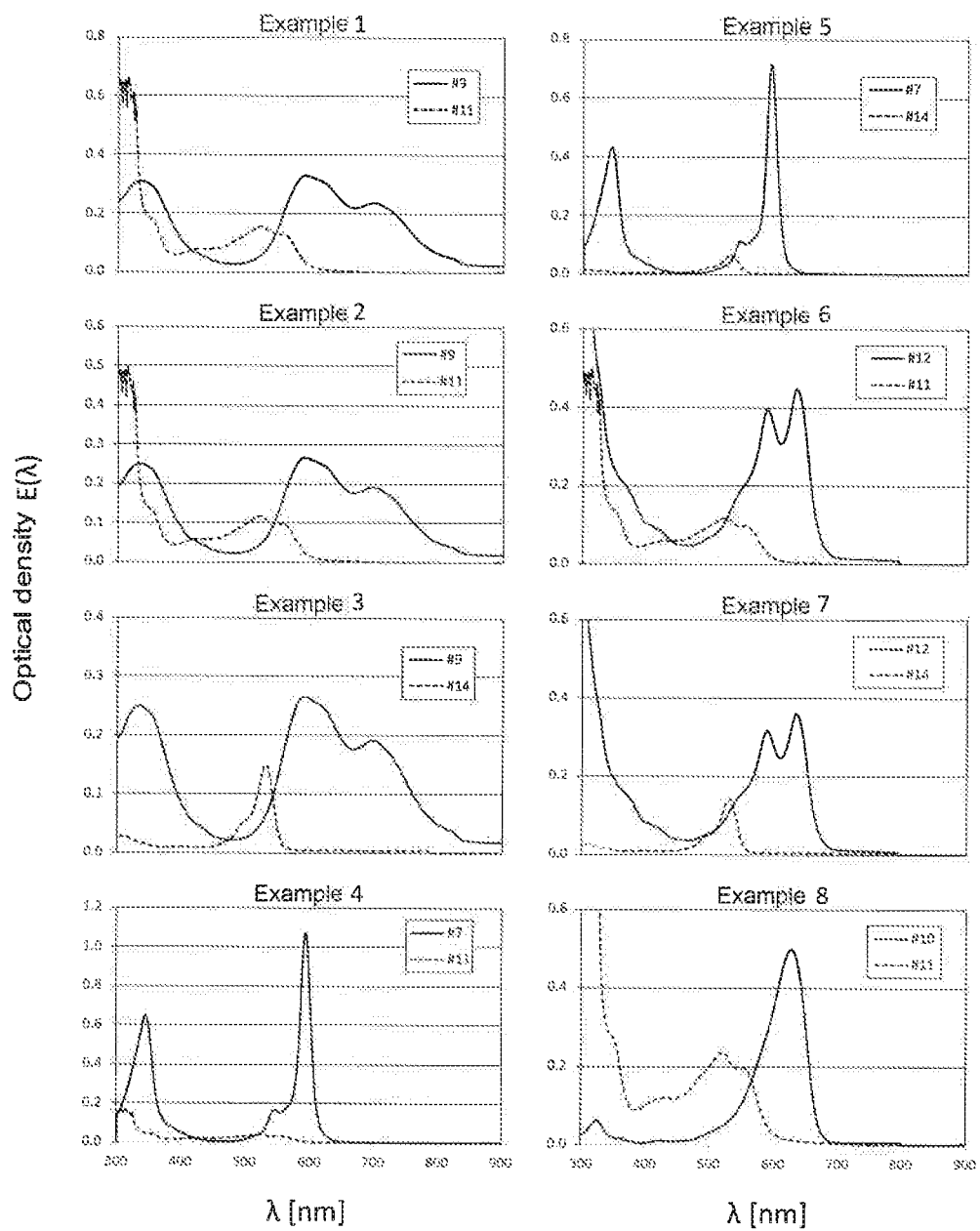
FIG. 11 is a graphical illustration of the optical densities of the illustrative films of Examples 1 through 8.
Figure 12:
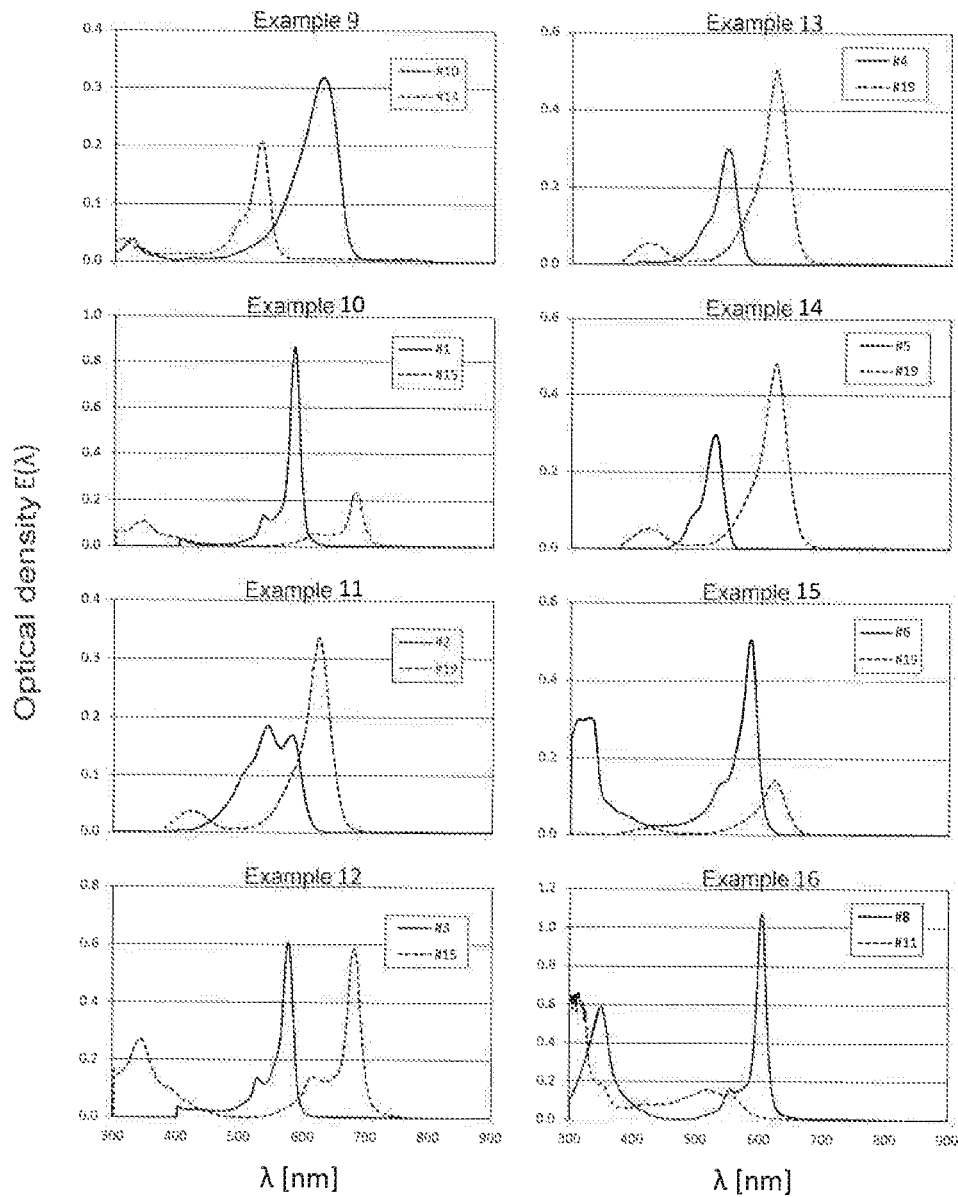
FIG. 12 is a graphical illustration of the optical densities of the illustrative films of Examples 8 through 16.
Figure 13:
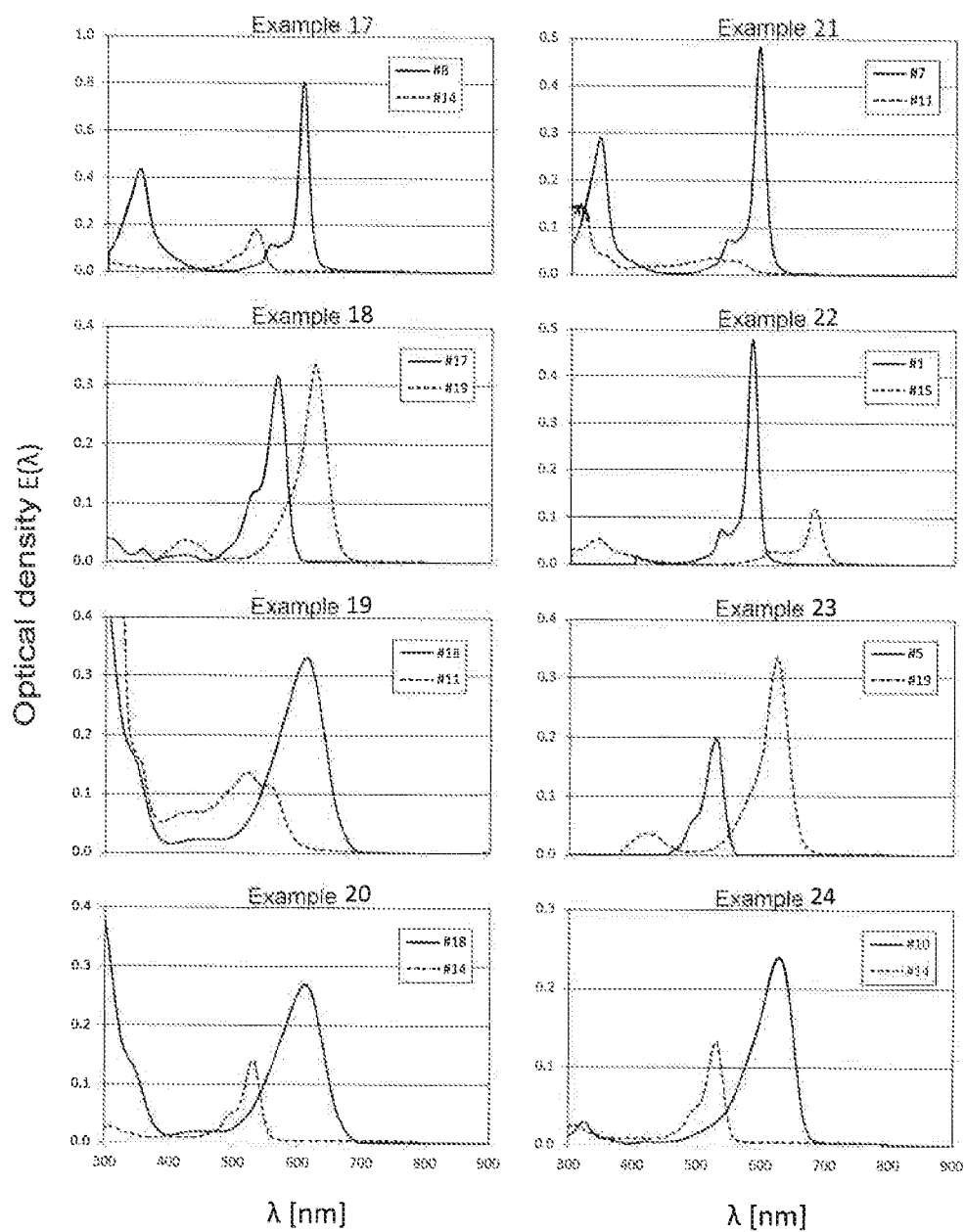
FIG. 13 is a graphical illustration of the optical densities of the illustrative films of Examples 17 through 24.

The invention will be illustrated below with the aid of drawings and examples. The drawings show FIG. 1 a schematic sectional view of a film having four layers and two bonding layers;

FIG. 2 transmission spectra of a film before and after UV irradiation in an irradiation chamber;

FIG. 3 absorbance of a film caused by UV irradiation, presented as absorption coefficient or optical density;

FIG. 4 absorption coefficients of an ideal dye according to the invention and also two commercial dyes;

FIG. 5 a schematic depiction of the instrumental and visual colour measurement or perception;

FIG. 6 the curve of a function $F_a(\lambda)$ for the empirical calculation of the colour change $\Delta a^*$;

FIG. 7 the curve of a function $F_b(\lambda)$ for the empirical calculation of the colour change $\Delta b^*$;

FIG. 8-10 absorption coefficients of the dyes #1 to #9;

FIG. 11-13 optical densities of illustrative films.

FIG. 1 shows a schematic sectional view of a film 1 according to the invention having four layers 2, 3, 4, 5 and two bonding layers 6, 7 which are arranged between the layers 2 and 3 and between the layers 4 and 5. The bonding layers 6, 7 serve to adhesively bond the layers 2 and 3 or 4 and 5. The film 1 is transparent and has an optical transmission of from 60 to 95%. One or more of the layers 2, 3, 4, 5 and bonding layers 6, 7 contain one or more dyes. The one or more dyes and the respective amount or mass thereof is selected in such a way that the film 1 has CIE colour values $a^*$ and $b^*$ such that $-7 \leq a^* \leq 0$, $-15 \leq b^* \leq 0$. The CIE colour values $a^*$ and $b^*$ are determined in accordance with DIN EN ISO 11664-1:2011-07, DIN EN ISO 11664-2:2011-07 and DIN EN ISO 11664-3:2013-08 using standard light CIE D65, 10° field of view and tristimulus curves $\bar{x}$, $\bar{y}$, $\bar{z}$ of the CIE standard valence system of 1931.

The thickness of the bonding layers 6, 7 is a factor of from 6 to 1000 smaller than the thickness of the layers 2, 3, 4, 5. Accordingly, the contribution of the bonding layers to the total weight of the film 1 and their barriers towards oxygen and water vapour is negligible. Apart from establishing an adhesive bond between adjacent layers, the bonding layers 6, 7 can also function as carriers for one or more dyes.

FIG. 2 shows the spectral transmission of a film according to the invention in the original state (t=0 min) and after UV irradiation for 120 minutes (t=120 min) in an irradiation chamber. In a wavelength range from about 400 to 600 nm, the irradiated film has a significantly reduced transmission or increased absorption compared to the unirradiated film. FIG. 3 shows the absorption coefficient determined from the transmission curves depicted in FIG. 2 as a function of the wavelength. In a wavelength range from about 430 to 440 nm, which overlaps with the range of violet light (400 to 450 nm), the absorption coefficient displays a maximum. The colour complementary to this wavelength range is yellow-green (cf. https://de.wikipedia.org/wiki/Kompiementär-farbe). In the range of visible light from 380 to 780 nm, i.e. without taking into account wavelengths of <380 nm, the greatest absorption (by area) is at 495.5 nm between blue and cyan. The complementary colour corresponding thereto is orange. This result is in agreement with the observation of an initially yellowish discolouration of the film which changes to brownish with increasing UV dose.

Based on the above-described colour measurements on UV-weathered films and mathematical analyses, the inventors have postulated an "ideal" dye which compensates a "representative yellowing" of a film. In the context of the present invention, the term "representative" relates to a UV dose to which a film is subjected under normal use conditions. The representative UV dose corresponds to 360 $KJ \cdot m^{-2}$ at a black standard temperature (BST) of 65° C. in accordance with DIN EN ISO 4892-2: 2013-06 B2. The irradiation of the films with the representative UV dose was carried out in a Suntest XLS+ instrument from Atlas Material Testing Technology GmbH.

The form or curve of the absorption coefficient of the "ideal" dye is shown in the graph of FIG. 4 as a function of the wavelength and corresponds to a Gaussian curve having a centre at 577 nm and full width at half maximum (FWHM) of 20 nm. At an appropriately selected content or optical density of the ideal dye, a film having CIE colour values $a^*$ and $b^*$ such that $-7 \leq a^* \leq 0$, $-15 \leq b^* \leq 0$ is obtained.

Furthermore, the absorption coefficient of the dye epolight 5819 from Epolin and of Cu-phthalocyanine are shown in FIG. 4. Surprisingly, the same CIE colour values $a^*$ and $b^*$ as in the case of the "ideal" dye are obtained by means of combination of the dyes epolight 5819 and Cu-phthalocyanine having a relatively low optical density under identical conditions, i.e. in films having the same nature and thickness. It should be rioted here that the scaling of the optical densities of epolight 5819 and Cu-phthalocyanine is increased by a factor of 2 relative to the "ideal" dye in the graph of FIG. 4.

FIG. 5 schematically shows the measurement of the CIE colour values $a^*$ and $b^*$ of a film 12 according to the invention by means of a spectrophotometric colorimeter 15. For this purpose, the film 12 is arranged or laid on a certified white scattering standard 14. The white scattering standard 14 consists of $BaSO_4$ or SPECTRALON® (sintered polytetrafluoroethylene) and corresponds to a virtually ideal Lambert reflector. The light used for the colour measurement is produced by a light source 10 conforming to CIE D65 or by a light source 10 having a known spectral intensity distribution 11. If the spectral intensity distribution 11 of the light source is not known, it is determined by means of a spectrophotometer (or spectrophotometric colorimeter). In the software-aided evaluation, the spectra recorded using the colorimeter are converted into spectra conforming to CIE 65 by multiplication by a wavelength-dependent factor $K(\lambda)$ which corresponds to the intensity ratio of a CIE 65 standard light source and the light source actually used, i.e.

$$K(\lambda) = \frac{I(CIE\ 65;\lambda)}{I(\text{light source};\lambda)}.$$

The light emitted by the light source 10 impinges on the film 12, passes through the latter for a first time, is diffusely reflected by the white scattering standard 14, passes through the film 12 a second time and is detected in the colorimeter 15. The calorimeter 15 comprises a spectrophotometer having a wavelength-dispersive optical element, in particular a grating, and a photodiode array. The diffusely reflected light from the film 12 is collected in combination with the white scattering standard 14 from a solid angle range having a conical opening angle of 10° and bundled onto the entry slit of the spectrophotometer.

The light emitted by the light source 10 is more or less strongly absorbed or attenuated as a function of the wavelength during the double passage through the film 12. The attenuation of the light in the film 12 is described mathematically by a wavelength-dependent transmission 13. For light quanta (photons), the film 12 represents a transmission filter having a wavelength-dependent transmission probability.

The spectrum recorded in the colorimeter 15 for the light reflected from the film 12 and the white scattering standard 14 is finally multiplied or convolved with tristimulus curves $\bar{x}, \bar{y}, \bar{z}$ of the CIE standard valence system of 1931 (reference 16 in FIG. 5) in order to calculate CE colour values X, Y, Z and a*, b*. The tristimulus curves $\bar{x}, \bar{y}, \bar{z}$ take into account the spectral sensitivities or actuation probabilities of the photoreceptors in the retina of the human eye (https://de.wikipedia.org/wiki/CIE-Normvalenzsystem).

FIG. 8 to 10 show the optical densities E(λ) or absorption coefficients α(λ) of the dyes #1 to #9 in standardized units as a function of the wavelength in the visible range from 380 to 780 nm. Numerical values corresponding thereto are shown in Table 2.

TABLE 2

| λ [nm] | #1 | #2 | #3 | #4 | #5 | #6 | #7 | #8 | #9 |
|---|---|---|---|---|---|---|---|---|---|
| 380 | 0.00 | 0.00 | 0.00 | 0.00 | 0.00 | 0.11 | 0.08 | 0.15 | 0.51 |
| 385 | 0.00 | 0.00 | 0.00 | 0.00 | 0.00 | 0.10 | 0.07 | 0.12 | 0.45 |
| 390 | 0.00 | 0.00 | 0.00 | 0.00 | 0.00 | 0.10 | 0.06 | 0.11 | 0.39 |
| 395 | 0.00 | 0.00 | 0.00 | 0.00 | 0.00 | 0.09 | 0.05 | 0.09 | 0.34 |
| 400 | 0.00 | 0.00 | 0.00 | 0.00 | 0.00 | 0.08 | 0.05 | 0.08 | 0.29 |
| 405 | 0.03 | 0.02 | 0.05 | 0.02 | 0.00 | 0.07 | 0.04 | 0.07 | 0.26 |
| 410 | 0.02 | 0.02 | 0.05 | 0.02 | 0.00 | 0.06 | 0.03 | 0.06 | 0.23 |
| 415 | 0.02 | 0.02 | 0.04 | 0.02 | 0.00 | 0.05 | 0.03 | 0.05 | 0.21 |
| 420 | 0.01 | 0.02 | 0.04 | 0.02 | 0.00 | 0.05 | 0.02 | 0.04 | 0.19 |
| 425 | 0.01 | 0.02 | 0.04 | 0.02 | 0.00 | 0.04 | 0.02 | 0.03 | 0.18 |
| 430 | 0.01 | 0.03 | 0.04 | 0.02 | 0.00 | 0.04 | 0.01 | 0.02 | 0.16 |
| 435 | 0.01 | 0.04 | 0.04 | 0.02 | 0.00 | 0.04 | 0.01 | 0.02 | 0.14 |
| 440 | 0.00 | 0.06 | 0.04 | 0.02 | 0.00 | 0.04 | 0.01 | 0.01 | 0.13 |
| 445 | 0.00 | 0.07 | 0.04 | 0.02 | 0.00 | 0.04 | 0.01 | 0.01 | 0.11 |
| 450 | 0.00 | 0.09 | 0.04 | 0.02 | 0.00 | 0.04 | 0.00 | 0.01 | 0.10 |
| 455 | 0.01 | 0.11 | 0.04 | 0.03 | 0.01 | 0.05 | 0.00 | 0.01 | 0.09 |
| 460 | 0.01 | 0.14 | 0.03 | 0.03 | 0.03 | 0.05 | 0.00 | 0.01 | 0.09 |
| 465 | 0.01 | 0.17 | 0.04 | 0.04 | 0.04 | 0.05 | 0.00 | 0.01 | 0.08 |
| 470 | 0.01 | 0.21 | 0.03 | 0.05 | 0.06 | 0.05 | 0.00 | 0.00 | 0.08 |
| 475 | 0.01 | 0.24 | 0.03 | 0.07 | 0.10 | 0.05 | 0.00 | 0.00 | 0.08 |
| 480 | 0.01 | 0.28 | 0.04 | 0.08 | 0.15 | 0.06 | 0.00 | 0.00 | 0.08 |
| 485 | 0.01 | 0.32 | 0.04 | 0.11 | 0.23 | 0.06 | 0.01 | 0.01 | 0.08 |
| 490 | 0.01 | 0.38 | 0.05 | 0.14 | 0.28 | 0.07 | 0.01 | 0.01 | 0.09 |
| 495 | 0.02 | 0.45 | 0.05 | 0.18 | 0.31 | 0.08 | 0.01 | 0.01 | 0.09 |
| 500 | 0.02 | 0.52 | 0.06 | 0.24 | 0.34 | 0.09 | 0.01 | 0.01 | 0.10 |
| 505 | 0.03 | 0.57 | 0.07 | 0.30 | 0.40 | 0.10 | 0.02 | 0.01 | 0.11 |
| 510 | 0.03 | 0.61 | 0.09 | 0.34 | 0.52 | 0.11 | 0.03 | 0.02 | 0.12 |
| 515 | 0.04 | 0.64 | 0.10 | 0.37 | 0.69 | 0.13 | 0.03 | 0.02 | 0.14 |
| 520 | 0.05 | 0.69 | 0.13 | 0.41 | 0.88 | 0.15 | 0.04 | 0.03 | 0.17 |
| 525 | 0.07 | 0.76 | 0.20 | 0.49 | 0.98 | 0.18 | 0.05 | 0.03 | 0.20 |
| 530 | 0.12 | 0.85 | 0.22 | 0.61 | 0.98 | 0.22 | 0.06 | 0.04 | 0.24 |
| 535 | 0.16 | 0.94 | 0.20 | 0.78 | 0.79 | 0.25 | 0.09 | 0.04 | 0.29 |
| 540 | 0.14 | 0.99 | 0.19 | 0.92 | 0.56 | 0.27 | 0.13 | 0.06 | 0.35 |
| 545 | 0.13 | 0.99 | 0.20 | 0.99 | 0.33 | 0.27 | 0.16 | 0.09 | 0.42 |
| 550 | 0.14 | 0.93 | 0.24 | 0.98 | 0.16 | 0.29 | 0.15 | 0.13 | 0.51 |
| 555 | 0.15 | 0.86 | 0.30 | 0.85 | 0.07 | 0.33 | 0.14 | 0.15 | 0.60 |
| 560 | 0.17 | 0.81 | 0.35 | 0.60 | 0.02 | 0.40 | 0.15 | 0.14 | 0.70 |
| 565 | 0.21 | 0.80 | 0.46 | 0.37 | 0.00 | 0.48 | 0.17 | 0.13 | 0.78 |
| 570 | 0.31 | 0.84 | 0.74 | 0.22 | 0.00 | 0.57 | 0.19 | 0.14 | 0.85 |
| 575 | 0.54 | 0.89 | 0.98 | 0.11 | 0.00 | 0.71 | 0.22 | 0.15 | 0.91 |
| 580 | 0.90 | 0.92 | 0.92 | 0.05 | 0.00 | 0.91 | 0.33 | 0.16 | 0.97 |
| 585 | 0.99 | 0.88 | 0.58 | 0.02 | 0.00 | 1.00 | 0.57 | 0.19 | 0.99 |
| 590 | 0.72 | 0.75 | 0.26 | 0.01 | 0.00 | 0.90 | 0.92 | 0.28 | 1.00 |
| 595 | 0.37 | 0.57 | 0.11 | 0.00 | 0.00 | 0.61 | 0.98 | 0.49 | 0.99 |
| 600 | 0.16 | 0.38 | 0.05 | 0.00 | 0.00 | 0.34 | 0.71 | 0.84 | 0.98 |
| 605 | 0.06 | 0.24 | 0.03 | 0.00 | 0.00 | 0.19 | 0.40 | 1.00 | 0.97 |
| 610 | 0.04 | 0.13 | 0.02 | 0.00 | 0.00 | 0.09 | 0.19 | 0.75 | 0.96 |
| 615 | 0.02 | 0.07 | 0.01 | 0.00 | 0.00 | 0.05 | 0.10 | 0.41 | 0.94 |
| 620 | 0.02 | 0.04 | 0.01 | 0.00 | 0.00 | 0.03 | 0.05 | 0.18 | 0.92 |
| 625 | 0.01 | 0.02 | 0.01 | 0.00 | 0.00 | 0.01 | 0.03 | 0.09 | 0.90 |
| 630 | 0.01 | 0.01 | 0.01 | 0.00 | 0.00 | 0.01 | 0.02 | 0.05 | 0.86 |
| 635 | 0.01 | 0.00 | 0.01 | 0.00 | 0.00 | 0.00 | 0.02 | 0.03 | 0.83 |
| 640 | 0.00 | 0.00 | 0.01 | 0.00 | 0.00 | 0.00 | 0.01 | 0.02 | 0.79 |
| 645 | 0.00 | 0.00 | 0.00 | 0.00 | 0.00 | 0.00 | 0.01 | 0.02 | 0.75 |
| 650 | 0.00 | 0.00 | 0.00 | 0.00 | 0.00 | 0.00 | 0.00 | 0.02 | 0.72 |
| 655 | 0.00 | 0.00 | 0.00 | 0.00 | 0.00 | 0.00 | 0.00 | 0.01 | 0.69 |
| 660 | 0.00 | 0.00 | 0.00 | 0.00 | 0.00 | 0.00 | 0.00 | 0.01 | 0.67 |
| 665 | 0.00 | 0.00 | 0.00 | 0.00 | 0.00 | 0.00 | 0.00 | 0.01 | 0.66 |
| 670 | 0.00 | 0.00 | 0.00 | 0.00 | 0.00 | 0.00 | 0.00 | 0.01 | 0.66 |
| 675 | 0.00 | 0.00 | 0.00 | 0.00 | 0.00 | 0.00 | 0.00 | 0.01 | 0.67 |
| 680 | 0.00 | 0.00 | 0.00 | 0.00 | 0.00 | 0.00 | 0.00 | 0.01 | 0.68 |
| 685 | 0.00 | 0.00 | 0.00 | 0.00 | 0.00 | 0.00 | 0.00 | 0.01 | 0.70 |
| 690 | 0.00 | 0.00 | 0.00 | 0.00 | 0.00 | 0.00 | 0.00 | 0.01 | 0.71 |
| 695 | 0.00 | 0.00 | 0.00 | 0.00 | 0.00 | 0.00 | 0.00 | 0.00 | 0.72 |
| 700 | 0.c0 | 0.00 | 0.00 | 0.00 | 0.00 | 0.00 | 0.00 | 0.00 | 0.71 |
| 705 | 0.00 | 0.00 | 0.00 | 0.00 | 0.00 | 0.00 | 0.00 | 0.00 | 0.71 |
| 710 | 0.00 | 0.00 | 0.00 | 0.00 | 0.00 | 0.00 | 0.00 | 0.00 | 0.69 |
| 715 | 0.00 | 0.00 | 0.00 | 0.00 | 0.00 | 0.00 | 0.00 | 0.00 | 0.67 |
| 720 | 0.00 | 0.00 | 0.00 | 0.00 | 0.00 | 0.00 | 0.00 | 0.00 | 0.65 |
| 725 | 0.00 | 0.00 | 0.00 | 0.00 | 0.00 | 0.00 | 0.00 | 0.00 | 0.62 |
| 730 | 0.00 | 0.00 | 0.00 | 0.00 | 0.00 | 0.00 | 0.00 | 0.00 | 0.60 |
| 735 | 0.00 | 0.00 | 0.00 | 0.00 | 0.00 | 0.00 | 0.00 | 0.00 | 0.56 |
| 740 | 0.00 | 0.00 | 0.00 | 0.00 | 0.00 | 0.00 | 0.00 | 0.00 | 0.53 |
| 745 | 0.00 | 0.00 | 0.00 | 0.00 | 0.00 | 0.00 | 0.00 | 0.00 | 0.49 |
| 750 | 0.00 | 0.00 | 0.00 | 0.00 | 0.00 | 0.00 | 0.00 | 0.00 | 0.45 |
| 755 | 0.00 | 0.00 | 0.00 | 0.00 | 0.00 | 0.00 | 0.00 | 0.00 | 0.41 |
| 760 | 0.00 | 0.00 | 0.00 | 0.00 | 0.00 | 0.00 | 0.00 | 0.00 | 0.37 |
| 765 | 0.00 | 0.00 | 0.00 | 0.00 | 0.00 | 0.00 | 0.00 | 0.00 | 0.34 |
| 770 | 0.00 | 0.00 | 0.00 | 0.00 | 0.00 | 0.00 | 0.00 | 0.00 | 0.31 |
| 775 | 0.00 | 0.00 | 0.00 | 0.00 | 0.00 | 0.00 | 0.00 | 0.00 | 0.28 |
| 780 | 0.00 | 0.00 | 0.00 | 0.00 | 0.00 | 0.00 | 0.00 | 0.00 | 0.26 |

Examples 1 to 24

A total of 25 multilayer films, hereinafter designated as Example 1 to 24 and Comparative Example 25, having a layer structure of the type 250 μm of PVC/30 μm of PE/71 μm of PVdC were produced. For this purpose, base films of PVC material comprising 92% by weight of PVC, from 6 to 8% by weight of customary industrial additives, e.g. thermal stabilizer, lubricant and impact modifier, and from 0 to 2% by weight of two colouring additives were firstly manufactured by means of a laboratory calendar. The thickness of the PVC films was in each case 250 μm. A total of from 0.01 to 2% by weight of two colouring additives, each containing a dye of the type #1 to #20 as per Table 1, were added to the PVC materials of Examples 1 to 24. The proportion by weight of each colouring additive was indicated by the manufacturer or established by the inventors by means of the measured optical density or absorption coefficient of the respective dye. No colouring additive was added to the PVC material of Comparative Example 25. A 30 µm thick PE film was laminated onto each of the PVC films of Examples 1 to 24 and of Comparative Example 25. The PE layer was subsequently coated with an aqueous PVdC dispersion in each of a number of passes and the coating was dried in order to obtain an integral PVdC layer having a total weight per unit area of 120 g/m² (corresponding to a thickness of 71 µm).

For each of the films of Examples 1 to 24 and the Comparative Example 25, a transmission spectrum $T_n(\lambda)$ where n=1, . . . , 25 was recorded using a spectrophotometer and the colour values a* and b* were determined using a spectrophotometric colorimeter. The total optical density $E_m(\lambda)$ was determined from the natural logarithm of the ratio $T_m(\lambda)/T_{25}(\lambda)$ of the transmission spectra $T_m(\lambda)$, m=1, . . . , 24 of Examples 1 to 24 and of Comparative Example 25 according to the relationship $$E_m(\lambda) = \ln\left(\frac{T_m(\lambda)}{T_{25}(\lambda)}\right).$$

The total optical density $E_m(\lambda)$ calculated in this way is in agreement with the sum of the optical densities of the two dyes weighted according to the established proportions by weight of the colouring additives.

The colour values a*, b*, the optical transmission and also further data of Examples 1 to 24 and of Comparative Example 25 are shown in Table 3.

$$^{5)}F_{Z2} = \frac{1}{1\,\text{nm}}\int_{520\,nm}^{600\,nm} E_Z(\lambda)d\lambda \;\;;\;\; ^{6)}F_{Z3} = \frac{1}{1\,\text{nm}}\int_{620\,nm}^{700\,nm} E_Z(\lambda)d\lambda$$

and $E_H(\lambda)$ and $E_Z(\lambda)$ are the optical densities of the respective main dye and of the supplementary dye. The integrals of the optical densities over the wavelength ranges from 420 to 500 nm, from 520 to 600 nm and from 620 to 700 nm serve as a measure of the strength of absorption of the respective dye for blue, green-yellow and red light.

FIGS. 11 to 13 show graphs of the optical densities of the dyes used in the films of Examples 1 to 24 in absolute units as a function of the wavelength.

The invention claimed is:

1. Single-layer or multilayer transparent film comprising one or more polymeric materials and one or more main dyes, wherein the film has CIE colour values a* and b* of $-7\leq a^*\leq 0$, $-15\leq b^*\leq 0$ and an optical transmission T of $60\%\leq T\leq 95\%$,
   wherein the film comprises one or more layers which, independently of one another, consist of a polymeric material having a proportion of from 60 to 99% by weight of polyvinylidene chloride (PVdC), based on the total weight of the layer,
   and said film contains one or more supplementary dyes which absorb light having wavelengths in range from 520 to 600 nm, where the main and supplementary dyes are present in a ratio of the integrated absorption of the one or more main dyes in the wavelength range from 520 to 600 nm to integrated absorption of the one or more supplementary dyes in the wavelength range from 520 to 600 nm is in the range from 4:1 to 1:1.

2. The film according to claim 1, wherein $-7\leq a^*\leq -5$, $-6\leq a^*\leq -4$, $-5\leq a^*\leq -3$, $-4\leq a^*\leq -2$, $-3\leq a^*\leq -1$ or $-2\leq a^*\leq 0$.

3. The film according to claim 1, wherein $-15\leq b^*\leq -11$, $-13\leq b^*\leq -9$, $-11\leq b^*\leq -7$, $-9\leq b^*\leq -5$, $-7\leq b^*\leq -3$.

TABLE 3

| Example No. | Main dye | Supplementary Dye | a* | b* | Optical transmission [%] | 1)$F_{B1}$ | 2)$F_{B2}$ | 3)$F_{B3}$ | 4)$F_{Z1}$ | 5)$F_{Z2}$ | 6)$F_{Z3}$ |
|---|---|---|---|---|---|---|---|---|---|---|---|
| 1 | #9 | #11 | −1.2 | −11.9 | 69 | 2.90 | 17.29 | 12.82 | 7.47 | 8.20 | 0.28 |
| 2 | #9 | #11 | −1.8 | −8.8 | 72 | 2.32 | 13.83 | 10.26 | 5.60 | 6.15 | 0.21 |
| 3 | #9 | #14 | −1.6 | −11.3 | 74 | 2.32 | 13.83 | 10.26 | 1.70 | 3.77 | 0.20 |
| 4 | #7 | #11 | −3.0 | −13.3 | 79 | 0.65 | 25.55 | 0.69 | 1.87 | 2.05 | 0.07 |
| 5 | #7 | #14 | −1.5 | −9.5 | 81 | 0.43 | 17.03 | 0.46 | 0.75 | 1.68 | 0.09 |
| 6 | #12 | #11 | −2.7 | −12.7 | 72 | 4.55 | 19.65 | 15.36 | 5.60 | 6.15 | 0.21 |
| 7 | #12 | #14 | −1.2 | −11.9 | 76 | 6.64 | 15.72 | 12.29 | 1.60 | 3.56 | 0.19 |
| 8 | #11 | #10 | −1.8 | −12.2 | 72 | 0.99 | 12.56 | 16.99 | 11.21 | 12.30 | 0.42 |
| 9 | #10 | #14 | −1.1 | −9.6 | 79 | 0.63 | 8.04 | 10.88 | 2.36 | 5.24 | 0.28 |
| 10 | #1 | #15 | −2.0 | −11.6 | 79 | 0.60 | 22.73 | 0.19 | 0.50 | 0.80 | 3.15 |
| 11 | #19 | #2 | −1.1 | −11.6 | 78 | 2.70 | 12.38 | 0.06 | 1.37 | 5.12 | 8.46 |
| 12 | #3 | #15 | −1.2 | −10.2 | 76 | 1.99 | 18.44 | 0.15 | 1.25 | 2.01 | 7.87 |
| 13 | #19 | #4 | −1.1 | −14.2 | 77 | 1.48 | 10.79 | 0.00 | 2.06 | 7.68 | 12.68 |
| 14 | #5 | #19 | −1.5 | −9.8 | 78 | 2.07 | 6.61 | 0.00 | 1.96 | 7.32 | 12.08 |
| 15 | #6 | #19 | −1.7 | −11.9 | 80 | 2.10 | 19.47 | 0.12 | 0.59 | 2.20 | 3.62 |
| 16 | #8 | #11 | −2.3 | −10.4 | 76 | 0.92 | 14.38 | 1.93 | 7.47 | 8.20 | 0.28 |
| 17 | #8 | #14 | −1.3 | −10.2 | 79 | 0.69 | 10.78 | 1.45 | 2.07 | 4.61 | 0.24 |
| 18 | #19 | #17 | −0.9 | −13.0 | 79 | 0.93 | 12.85 | 0.04 | 1.37 | 5.12 | 8.46 |
| 19 | #11 | #18 | −0.9 | −10.0 | 76 | 1.81 | 13.74 | 8.42 | 6.54 | 7.17 | 0.24 |
| 20 | #18 | #14 | −1.0 | −9.7 | 79 | 1.48 | 11.24 | 6.89 | 1.60 | 3.56 | 0.19 |
| 21 | #7 | #11 | −2.0 | −4.4 | 82 | 0.58 | 22.99 | 0.62 | 3.36 | 3.69 | 0.13 |
| 22 | #1 | #15 | −1.8 | −5.0 | 82 | 0.66 | 25.26 | 0.21 | 0.50 | 0.80 | 3.15 |
| 23 | #5 | #19 | −2.2 | −5.4 | 81 | 2.76 | 8.81 | 0.00 | 2.75 | 10.24 | 16.91 |
| 24 | #10 | #14 | −2.5 | −5.6 | 81 | 0.95 | 12.06 | 16.32 | 3.01 | 6.70 | 0.35 |
| 25 | — | — | −0.61 | 5.83 | 87 | — | — | — | — | — | — |

$$^{1)}F_{H1} = \frac{1}{1\,\text{nm}}\int_{420\,nm}^{500\,nm} E_H(\lambda)d\lambda \;\;;\;\; ^{2)}F_{H2} = \frac{1}{1\,\text{nm}}\int_{520\,nm}^{600\,nm} E_H(\lambda)d\lambda \;\;;$$

$$^{3)}F_{H3} = \frac{1}{1\,\text{nm}}\int_{620\,nm}^{700\,nm} E_H(\lambda)d\lambda \;\;;\;\; ^{4)}F_{Z1} = \frac{1}{1\,\text{nm}}\int_{420\,nm}^{500\,nm} E_Z(\lambda)d\lambda \;\;;$$

4. The film according to claim 1, wherein the film has an optical transmission T of 65%≤T≤95%, 70%≤T≤95%, 75%≤T≤95%, 80%≤T≤95%, 85%≤T≤95% or 90%≤T≤95%.

5. The film according to claim 1, wherein said film contains one or more main dyes which absorb light having wavelengths in a range from 520 to 600 nm.

6. The film according to claim 1, wherein the film comprises one or more layers which, independently of one another, consist of a polymeric material having a proportion of from 60 to 99% by weight of vinyl chloride polymer (VCP), based on the total weight of the layer.

7. A blister film comprising the film according to claim 1.

8. A process for producing the single-layer or multilayer transparent film according to claim 1 comprised of one or more polymeric materials formed in one or more film plants, said process comprising the steps:

(a) providing one or more polymeric materials;
(b) providing one or more dyes;
(c) mixing of the one or more dyes with one or more of the polymeric materials in predetermined proportions;
(d) plasticizing the one or more polymeric materials in one or more gelling apparatuses; and
(e) shaping one or more polymeric materials into the film by extruding, coextruding, calendering, coating, extrusion coating and/or laminating;

wherein the one or more dyes are added in such proportions that the film has CIE colour values $a^*$ and $b^*$ of $-7 \leq a^* \leq 0$, $-15 \leq b^* \leq 0$ and an optical transmission T of 60%≤T≤95%.

9. The film according to claim 1, wherein the film further comprises (i) one or more layers comprising vinyl chloride polymer (VCP) and (ii) one or more layers comprising polyethylene (PE).

* * * * *